(12) United States Patent
Inukai et al.

(10) Patent No.: US 7,097,581 B2
(45) Date of Patent: Aug. 29, 2006

(54) HEAVY DUTY POWER TRANSMISSION V-BELT

(75) Inventors: Masahiro Inukai, Kobe (JP); Keizo Nonaka, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 192 days.

(21) Appl. No.: 10/642,286

(22) Filed: Aug. 18, 2003

(65) Prior Publication Data

US 2004/0033855 A1 Feb. 19, 2004

(30) Foreign Application Priority Data

Aug. 19, 2002 (JP) .............................. 2002-237792

(51) Int. Cl.
*F16G 5/16* (2006.01)

(52) U.S. Cl. ...................................... 474/242; 474/245

(58) Field of Classification Search ................. 474/201, 474/260, 242–245
See application file for complete search history.

(56) References Cited

U.S. PATENT DOCUMENTS

| 4,610,648 | A | | 9/1986 | Miranti, Jr. | |
|---|---|---|---|---|---|
| 4,676,768 | A | * | 6/1987 | Miranti et al. | 474/286 |
| 4,813,920 | A | * | 3/1989 | Inukai et al. | 474/240 |
| 6,283,882 | B1 | * | 9/2001 | Nonaka et al. | 474/242 |
| 6,293,886 | B1 | * | 9/2001 | Ohkawa et al. | 474/242 |

(Continued)

FOREIGN PATENT DOCUMENTS

EP 0 994 277 A1 12/1999

(Continued)

OTHER PUBLICATIONS

European Search Report in corresponding Patent Application No. EP 03 01 8493 dated Dec. 13, 2004.

(Continued)

*Primary Examiner*—Marcus Charles
(74) *Attorney, Agent, or Firm*—Thomas W. Cole; Nixon Peabody LLP

(57) ABSTRACT

In a heavy duty power transmission V-belt B formed by engaging tension members 1 and 1 with a plurality of blocks 10, 10, . . . , to prevent as much as possible each block 10 from producing failure at the high-speed running of the belt, a fitting part 12 of each block 10 has an indent 22 formed by upwardly recessing a portion of a resin part 17 located between an upper ridge 14 and an innermost abutment surface 20 of the fitting part 12. Thereby, no edge exists between the innermost abutment surface 20 and the upper ridge 14 so that stress can be distributed. This prevents the occurrence of a crack in the resin part 17 due to stress concentration on the edge, the occurrence of a crack in a reinforcement 18 of each block 10 beginning at the leading end of the crack in the resin part 17, and in turn the fracture of an upper beam 18a of the reinforcement 18, thereby providing enhanced resistance against failure of the block 10. Furthermore, even when a shape-retaining rubber layer 1a of the tension member 1 thermally expands, the amount of expansion thereof is released into the indent 22. This prevents early introduction of permanent deformation of the shape-retaining rubber layer 1a and occurrence of an excessive force in the block 10 due to a compressive force produced in the fitting part 12, which prevents the occurrence of wobbling between the tension member 1 and each block 10. Furthermore, it can be prevented that the shape-retaining rubber layer 1a produces heat because of excessive deformation and in turn causes thermal expansion and thermal deterioration.

16 Claims, 23 Drawing Sheets

U.S. PATENT DOCUMENTS 6,464,606 B1 * 10/2002 Brandsma et al. .......... 474/242
6,500,086 B1 * 12/2002 Serkh et al. ................. 474/245
6,679,798 B1 *  1/2004 Takagi et al. ............... 474/242
6,857,980 B1 *  2/2005 van Liempd et al. ....... 474/242

FOREIGN PATENT DOCUMENTS

| EP | 0 994 276 A1 | | 4/2000 |
|---|---|---|---|
| EP | 1 167 813 A1 | | 1/2002 |
| JP | 63-157550 | | 10/1988 |
| JP | 05-272595 | | 10/1993 |
| JP | 06-69490 A | | 9/1994 |
| JP | 07-29332 B | | 7/1995 |
| JP | 11-82637 A | * | 3/1999 |
| JP | 2000-104796 A | * | 4/2000 |
| JP | 2000-120797 | | 4/2000 |
| JP | 2000-120798 | | 4/2000 |
| JP | 2000-120798 A | | 4/2000 |
| JP | 2000-120799 A | * | 4/2000 |
| JP | 2000-310294 A | * | 11/2000 |
| JP | 2001-3994 A | * | 1/2001 |
| JP | 2002-5240 | | 1/2002 |
| JP | 2002-130383 | | 5/2002 |

OTHER PUBLICATIONS

*Notice of Reasons of Rejection* in corresponding Japanese Patent Application No. 2002-237792 dated Aug. 30, 2005 (with full English Translation).

*Notice of Reasons of Rejection* in corresponding Japanese Patent Application No. 2002-237792 dated Nov. 29, 2005 (with full English Translation).

* cited by examiner

HEAVY DUTY POWER TRANSMISSION V-BELT

BACKGROUND OF THE INVENTION (a) Field of the Invention

This invention relates to a heavy duty power transmission V-belt formed by engaging and securing a plurality of blocks to one or more tension members.

(b) Description of the Related Art

There have been conventionally known heavy duty power transmission V-belts in which a plurality of blocks are securely engaged to one or more tension members using their matingly engaged structure, as disclosed in, for example, Japanese Unexamined Utility Model Publication No. 1-55344 (Japanese Examined Utility Model Publication No. 7-29332), Japanese Unexamined Utility Model Publication No. 6-69490 or Japanese Unexamined Patent Publication No. 5-272595. These V-belts are used, for example, in the field of continuously variable transmissions. In these V-belts, for the purpose of ensuring their flexibility, the securement of each block to the tension member is made not by adhesion but by physical engagement (mating engagement).

A belt of this kind includes, for example, a pair of right and left tension members aligned widthwise of the belt. Each tension member is provided with a set of upper receiving parts in the top and a set of lower receiving parts in the bottom, each set of the receiving parts consisting of a plurality of elongated recesses aligned lengthwise of the belt in pairs of oppositely disposed upper and lower elongated recesses. In the belt, as shown in FIGS. 26 and 27, each block 10 is formed at both lateral sides with indented slot-like fitting parts 12 and 12 (only one shown in the figures) each for receiving the associated tension member (not shown). The upper face of each fitting part 12 is provided with an upper ridge 14 as an upper inserting part, while the bottom face thereof is provided with a lower ridge 15 as a lower inserting part. Each block 10 is securely engaged to both the tension members by fitting the tension members into the associated right and left fitting parts 12 and 12 of the block 10 by press insertion.

In a proposed example disclosed in Japanese Patent Publication No. 3044212, the back of the fitting part of each block in the direction of insertion of the tension member is formed at the lower corner with a lower abutment surface inclined to become deeper with the approach to the top. When the lower abutment surface is formed downward from the pitch line or above, a relationship $\beta-3<\alpha<\beta+3$ is established between a lower abutment surface angle $\alpha$ made by the lower abutment surface and a vertical plane along the length of the belt and a belt side face angle $\beta$ made by the contact part of each block side surface with a pulley and the vertical plane. On the other hand, when the lower abutment surface is formed downward from below the pitch line, another relationship $\alpha \leq \beta$ is established between them. According to this proposed example, the proper relationships hold between the angle of a lower abutment part of the side surface of the tension member facing to the back of the fitting part of the block and the angle of the lower abutment surface of the block. This suppresses the occurrence of local wear, resulting in enhanced durability and reduced noise of the belt.

In the V-belts of this kind that includes the above proposed example, each block is formed of a complex of a reinforcement and a resin part. The reinforcement is made of a high-strength material such as metals including an aluminum alloy or steel, and is used to bear loads applied to the block. The resin part is used to form the contact part of the block with the pulley and the fitting parts of the block with the tension members.

The above proposed example, however, does not completely satisfy the demand for further enhanced performance and extended scope of application of the belt, and has room for improvement. In particular, when the belt is run at high speeds, there arises a problem that the block may be broken for the following reasons:

(1) At the high-speed running of the belt, each block undergoes severe vibration on the tension members to take loads from the tension members.

(2) When the belt contacts with the pulley at high speeds, the contact surfaces of each block with the pulley take heavy shock loads from the pulley.

(3) Each block has contact surfaces that are located at both ends of each of the upper and lower beams and will be points of application of force, and therefore each of the upper and lower beams takes the form of a bilateral cantilever beam. In this case, the root of each cantilever section receives the maximum bending moment. Therefore, stresses concentrate on the roots of the upper and lower cantilever beams, from which portions failure is likely to occur.

(4) In addition, it is difficult that edges of the resin part of each block forming the root ends of the upper and lower inserting/receiving parts of the upper and lower beams combine a form suitable for engagement with the tension member and a form that can avoid stress concentration. Therefore, stresses concentrate on the edges of the resin part so that the resin part may be damaged from any of them and produce a crack. When the crack reaches the reinforcement, the reinforcement may be broken beginning at the crack, resulting in fracture of the upper or lower beam of the block.

Specifically, as shown in FIGS. 26 and 27, the back of the fitting part 12 of each block 10 in the direction of insertion of the tension member is formed with an innermost abutment surface 20, edges E and E are formed at the meeting points between the innermost abutment surface and both the upper and lower ridges (inserting parts) 14 and 15. Stress concentration on the edges E and E invites the occurrence of a crack in the resin part. When the crack produced in the resin part reaches the reinforcement, the reinforcement also produces a crack beginning at the crack in the resin part, and finally invites the fraction of the upper or lower beam.

An object of the present invention is to prevent as much as possible each block of a heavy duty power transmission V-belt with one or more tension members, such as shown in the above proposed example, from producing failure at the high-speed running of the belt, by improving the structure of the fitting part of the block.

SUMMARY OF THE INVENTION

To attain the above object, in the present invention, the fitting part of each block is formed with an indent between the upper inserting/receiving part and the innermost abutment surface, and the indent distributes stress applied to the resin part.

More specifically, the present invention is directed to a heavy duty power transmission V-belt comprising: at least one endless tension member a top surface of which on the back face side of the belt is provided with a plurality of upper receiving/inserting parts aligned lengthwise of the belt and a bottom surface of which on the bottom face side of the belt is provided with a plurality of lower receiving/inserting parts aligned lengthwise of the belt in correspondence with the plurality of upper receiving/inserting parts; and a plurality of blocks each of which has at least one fitting part into which one tension member is fitted by press insertion and contact parts respectively provided in side surfaces thereof in the widthwise direction of the belt and contactable with side faces of a pulley groove, the at least one fitting part being formed at the upper face with an upper inserting/receiving part mating with the upper receiving/inserting part of the tension member and being formed at the lower face with a lower inserting/receiving part mating with the lower receiving/inserting part of the tension member, wherein through the fitting of the tension member into the fitting part of each of the blocks, the plurality of blocks are securely engaged to the tension member so that both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission.

In the above V-belt, each of the blocks is formed of a resin part constituting at least the contact part and the fitting part, and a reinforcement at least partly embedded in the resin part and made of a material having a higher modulus of elasticity than the resin part. Furthermore, the back of the fitting part of each of the blocks in the direction of insertion of the tension member is formed with an innermost abutment surface against which an abutment part of the tension member located at a leading end thereof in the direction of insertion of the tension member abuts, and the fitting part is formed with an indent by upwardly recessing a portion of the resin part located between the upper inserting/receiving part and the innermost abutment surface.

In the above configuration of the present invention, the fitting part of each block has an indent formed by upwardly recessing a portion of the resin part located between the upper inserting/receiving part and the innermost abutment surface of the fitting part. The formation of the indent results in the absence of an edge between the innermost abutment surface and the upper inserting/receiving part of the fitting part so that stress can be distributed through the indent. This prevents the occurrence of a crack in the resin part due to stress concentration on the edge, the occurrence of a crack in the reinforcement beginning at the leading end of the crack in the resin part, and in turn the fracture of the upper beam of the reinforcement, thereby providing significantly enhanced resistance against failure of the block.

According to the above configuration, the following effects can also be obtained. Specifically, as disclosed in Japanese Unexamined Utility Model Publication No. 1-55344, when the minimum thickness between the upper and lower receiving/inserting parts of the tension member is made larger than the maximum clearance between the upper and lower inserting/receiving parts of each block, and the upper and lower inserting/receiving parts of each block are matingly engaged with the upper and lower receiving/inserting parts of the tension member with the tension member compressively elastically deformed, the tension member is fitted into the fitting part of each block while compressed. Thus, the fitting strength between the block and the tension member is enhanced and the frictional resistance of the tension member to oscillation of the block is increased, so that the block can be firmly engaged and secured to the tension member while its oscillation is restricted. Therefore, when the V-belt turns on a pulley, the belt can be engaged with the pulley with all involved blocks oriented in the radial direction of the pulley while the blocks are prevented from interfering with one another. Even when there arises an unbalanced force due to a time interval between abutments of the side surfaces of adjacent blocks on the pulley groove face, oscillation of the block due to such an unbalanced force can be suppressed, thereby preventing the occurrence of wobbling resulting from the oscillation of the block. This prevents early failure of each block due to concentration of lateral pressure from the pulley on the upper end of the block, and early fracture of the tension member due to production of frictional heat. Furthermore, since the tension member is fitted with each block while compressed, deterioration of rubber material forming the tension member, such as deformation and wear, and the attendant occurrence of wobbling can be delayed correspondingly, which provides enhanced durability of the belt.

Japanese Unexamined Utility Model Publication No. 1-55344 discloses that the compressively elastic deformation of the tension member is preferably set so that the relationship between the minimum thickness $Tt$ between the upper and lower receiving/inserting parts of the tension member and the maximum clearance $Tb$ between the upper and lower inserting/receiving parts of each block is $1 < Tt/Tb \leq 1.2$.

When the temperature of the entire belt rises because of differences in thermal expansibility among materials forming the belt, however, the value $Tt/Tb$ may be excessively increased. The reason for this is that the rubber forming the tension member has a larger thermal expansibility than the resin part of the block and the reinforcement made of aluminum or the like, and therefore the temperature rise of the entire belt causes the tension member to have a relatively large dimension. This increases the interference between the tension member and the block from its initial condition. As a result, the rubber part of the tension member may be permanently deformed, and the block may take an excessive force because of a compressive force produced in the fitting part.

To cope with the these problems, in the configuration of the present invention, the indent provided between the innermost abutment surface and the upper inserting/receiving part of the fitting part of each block creates a space at the back of the fitting part. Therefore, even when the tension member thermally expands, the amount of expansion of the tension member is released into the space so that only a low load is applied to the block. This prevents early invitation of permanent deformation of the rubber part of the tension member and occurrence of an excessive force in the block due to a compressive force produced in the fitting part.

Furthermore, the relationship $Tt/Tb$ for the interference can be maintained at a value larger than 1 for a long time, which prevents the occurrence of wobbling.

When the interference has such a dimension that the rubber part forming the tension member would otherwise produce permanent deformation, the excessive deformation of the rubber part may increase heat production and in turn further increase the belt temperature, thereby inviting thermal expansion and thermal deterioration of the rubber part. According to this invention, however, these adverse effects can also be prevented.

The indent and the upper end of the innermost abutment surface are preferably connected together by a curved surface to merge smoothly into each other. With this structure, stress concentration becomes less likely to occur on the curved surface having no angular shape. This results in stress reduction.

The indent preferably has substantially an arcuate shape. When the indent has substantially an arcuate shape, the curvature of the indent is uniform as a whole. Therefore, even when the direction of stress application is changed, stress concentration can be avoided constantly.

Edges between the indent and both the front and rear surfaces of each of the blocks in the lengthwise direction of the belt are preferably chamfered in an arcuate cross-section. When edges between the indent and both the front and rear surfaces of each block in the belt lengthwise direction are chamfered, even on the application of a bending stress on the beam of each block located above the fitting part, stress concentration on the edges can be reduced.

The uppermost end of the indent is preferably located at the same level with or above the upper end of the upper inserting/receiving part of the fitting part. Specifically, the object for providing an indent is to eliminate the edge between the innermost abutment surface and the upper inserting/receiving part of each block. Even if only part of the edge is left, stress concentration will occur at that part. Therefore, when the indent is formed in a size that can accommodate the entire height of the upper inserting/receiving part of each block by locating the uppermost end of the indent at the same level with or above the upper end of the upper inserting/receiving part of the fitting part, stress can be distributed.

An edge between the upper receiving/inserting part and the abutment part of the tension member is preferably located in the indent.

According to the above structure, part of the upper receiving/inserting part of the tension member located toward the back of the fitting part does not interfere with the block in the indent. As a result, when the tension member is press-inserted into the fitting part of the block, only that part of the upper receiving/inserting part is not compressed so that the portion of the tension member on the back side of the fitting part has a larger thickness than the portion thereof on the opening side of the fitting part. With this thickness difference, the portion of the tension member on the back side of the fitting part is snagged on the inner end of the upper inserting/receiving part of each block, and therefore the tension member is difficult to disengage from the block.

Since a portion of the rubber part of the tension member receiving compressive forces from the block causes deterioration such as deformation or wear with the use of the belt, a step is thus formed in the tension member. This step, even if wobbling occurs between the block and the tension member, restricts movements of the tension member in the directions of insertion and withdrawal of the block. As a result, oscillation of the block relative to the tension member can be damped to prevent early failure of the block.

Furthermore, there can be prevented heat production due to friction between the tension member and the fitting part resulting from the oscillation of the block, temperature rise, rubber deterioration and occurrence of a crack in the tension member due to the heat production, failure of the block due to the crack and fracture of the tensile cord of the tension member.

In the present invention, in a heavy duty power transmission V-belt having the same configuration as that of the first-mentioned heavy duty power transmission V-belt, each of the blocks can be formed of a resin part constituting at least the contact part and the fitting part, and a reinforcement at least partly embedded in the resin part and made of a material having a higher modulus of elasticity than the resin part, the back of the fitting part of each of the blocks in the direction of insertion of the tension member can be formed with an innermost abutment surface against which an abutment part of the tension member located at a leading end thereof in the direction of insertion of the tension member abuts, the fitting part can be formed with an indent by upwardly recessing a portion of the resin part located between the upper inserting/receiving part and the innermost abutment surface, and the relationship $\theta 2-3<\theta 1<\theta 2+3$ can be established between an innermost abutment surface angle $\theta 1$ (unit: °) made by a portion of the innermost abutment surface located between corresponding positions thereof to the lower end of the upper inserting/receiving part of the fitting part and the upper end of the lower inserting/receiving part of the fitting part and a vertical plane along the length of the belt and a belt side face angle $\theta 2$ (unit: °) made by the contact parts of the right and left side surfaces of each of the blocks and the vertical plane.

As shown in Japanese Patent Publication No. 3044212, when the back of the fitting part of each block in the direction of insertion of the tension member is formed at the lower corner with a lower abutment surface, and a relationship $\beta-3<\alpha<\beta+3$ is established between the lower abutment surface angle $\alpha$ (unit: °) made by the lower abutment surface and the vertical plane and the belt side face angle $\beta$ (unit: °) made by the contact part of each block side surface with a pulley and the vertical plane, the occurrence of local wear of the tension member and heat production of the belt is suppressed, resulting in enhanced durability of the heavy duty power transmission V-belt. Furthermore, in respect of the balance of the tension member, if the above angular relationship holds not for only the lower abutment surface of the fitting part but for the entire innermost abutment surface thereof, the similar balance of the tension member will be maintained even when the bearing stress profile of the innermost abutment surface is changed.

However, if the entire innermost abutment surface is actually inclined over its length corresponding to the thickness of the tension member, the reinforcement will have the shape that the abutment surface is cut back to a great extent at the root of the upper beam. Therefore, it is impossible to form the entire innermost abutment surface into an inclined surface.

To cope with this, in the second-mentioned V-belt of the present invention, attention is focused on that in the innermost abutment surface of the fitting part of each block, a region located above the position corresponding to the upper receiving/inserting part of the tension member fitted into the fitting part and a region located below the position corresponding to the lower receiving/inserting part of the tension member each have a shape such as a small rib that has a large modulus of deformation under bearing stress and therefore does not stand a large bearing stress, and that on the other hand, an intermediate region of the innermost abutment surface located between the positions corresponding to the upper and lower receiving/inserting parts of the tension member is formed into a continuous surface near to the cord of the tension member, can stand a large bearing stress, and in actuality mainly stand bearing stresses. Therefore, over the intermediate region of the innermost abutment surface located between the corresponding positions to the upper and lower receiving/inserting parts of the tension member, or between the corresponding positions to the lower end of the upper receiving/inserting part and the upper end of the lower receiving/inserting part, the relationship $\theta 2-3<\theta 1<\theta 2+3$ is established between the innermost abutment surface angle $\theta 1$ and the belt side face angle $\theta 2$.

As a result, without the reinforcement having the shape that the abutment surface is cut back to a great extent at the root of the upper beam as in the case where the innermost abutment surface is inclined entirely, the occurrence of local wear of the tension member can be prevented, thereby providing improved durability of the heavy duty power transmission V-belt.

Furthermore, in this case, since the fitting part of each block has an indent formed by upwardly recessing a portion of the resin part located between the upper inserting/receiving part and the innermost abutment surface, the same effects as those of the first-mentioned V-belt can be obtained, which provides further enhanced durability of the heavy duty power transmission V-belt.

In the first-mentioned heavy duty power transmission V-belt, the reinforcement of each of the blocks may be formed of upper and lower beams located above and below the fitting part, respectively, and a pillar connecting between the root ends of both the upper and lower beams, and a beam angle made by the longitudinal center line of the upper beam and the side face of the pulley groove located closer to the center of the pulley than the contact position of the contact part of each said block located above the fitting part may be set at 90° or more.

Furthermore, in the first-mentioned heavy duty power transmission V-belt, the reinforcement of each of the blocks may be formed of upper and lower beams located above and below the fitting part, respectively, and a pillar connecting between the root ends of both the upper and lower beams, and a beam angle made by the longitudinal center line of a root end side portion of the upper beam and the side face of the pulley groove located closer to the center of the pulley than the contact position of the contact part of each said block located above the fitting part may be set at 90° or more, while a beam angle made by the longitudinal center line of a distal end side portion of the upper beam and the side face of the pulley groove located closer to the center of the pulley than the contact position of the contact part of each said block located above the fitting part may be set at less than 90°.

In these structures, the beam angle made by the longitudinal center line of the whole or the root end side portion of the upper beam of the reinforcement of each block, which is located above the fitting part, and the side face of the pulley groove located closer to the pulley center than the contact position of the contact part of the block side surface located above the fitting part is set at 90° or more. Therefore, the reinforcement is located at a large distance above from the root of the upper beam of the block. As a result, the indent can be formed in a portion of the resin part located below the root of the upper beam, and the formation of the indent can be facilitated.

In the present invention, instead of providing an indent between the upper inserting/receiving part and the innermost abutment surface of the fitting part of each block as described so far, an indent may be provided by downwardly recessing a portion of the resin part located between the lower inserting/receiving part and the innermost abutment surface of the fitting part of each block so that stress can be distributed through the indent. Thus, the same effects as those of the first-mentioned V-belt can be obtained.

Specifically, in the present invention, in a heavy duty power transmission V-belt including the same preamble as that of the first-mentioned V-belt, each of the blocks may be formed of a resin part constituting at least the contact part and the fitting part, and a reinforcement at least partly embedded in the resin part and made of a material having a higher modulus of elasticity than the resin part, the back of the fitting part of each of the blocks in the direction of insertion of the tension member may be formed with an innermost abutment surface against which an abutment part of the tension member located at a leading end thereof in the direction of insertion of the tension member abuts, and the fitting part may be formed with an indent by downwardly recessing a portion of the resin part located between the lower inserting/receiving part and the innermost abutment surface.

According to this configuration, since an indent is provided between the lower inserting/receiving part and the innermost abutment surface of the fitting part of each block, this results in the absence of an edge between the innermost abutment surface and the lower inserting/receiving part of the fitting part so that stress can be distributed through the indent. Therefore, there can be prevented the occurrence of a crack in the resin part due to stress concentration on the edge, the occurrence of a crack in the reinforcement beginning at the leading end of the crack in the resin part, and in turn the fracture of the lower beam of the reinforcement, thereby providing significantly enhanced resistance against failure of the block.

Furthermore, like the first-mentioned V-belt, there can be prevented early invitation of permanent deformation of the rubber part of the tension member and occurrence of an excessive force in the block due to a compressive force produced in the fitting part. Moreover, the occurrence of wobbling between the tension member and the block can be prevented. In addition, heat production of the rubber part of the tension member due to excessive deformation can be suppressed, thereby preventing further thermal expansion and thermal deterioration of the rubber part.

In the above heavy duty power transmission V-belt, the indent and the lower end of the innermost abutment surface are preferably connected together by a curved surface to merge smoothly into each other. This results in stress reduction, like the first-mentioned V-belt.

In the above heavy duty power transmission V-belt, the indent preferably has substantially an arcuate shape. In this manner, like the first-mentioned V-belt, the curvature of the indent becomes uniform as a whole. Therefore, even when the direction of stress application is changed, stress concentration can be avoided constantly.

In the above heavy duty power transmission V-belt, edges between the indent and both the front and rear surfaces of each of the blocks in the lengthwise direction of the belt are preferably chamfered in an arcuate cross-section. Therefore, even on the application of a bending stress on the beam of each block located below the fitting part, stress concentration on the edges can be reduced.

In the above heavy duty power transmission V-belt, the lowermost end of the indent is preferably located at the same level with or below the lower end of the lower inserting/receiving part of the fitting part. Thus, like the first-mentioned V-belt, stress can be distributed.

In the above heavy duty power transmission V-belt, the edge between the lower receiving/inserting part and the abutment part of the tension member is preferably located in the indent. Thus, the same effects as those of the first-mentioned V-belt can be obtained.

Furthermore, the present invention is directed to a heavy duty power transmission V-belt comprising: at least one endless tension member a top surface of which on the back face side of the belt is provided with a plurality of upper receiving/inserting parts aligned lengthwise of the belt and a bottom surface of which on the bottom face side of the belt is provided with a plurality of lower receiving/inserting parts aligned lengthwise of the belt in correspondence with the plurality of upper receiving/inserting parts; and a plurality of blocks each of which has at least one fitting part into which said one tension member is fitted by press insertion and contact parts respectively provided in side surfaces thereof in the widthwise direction of the belt and contactable with side faces of a pulley groove, said at least one fitting part being formed at the upper face with an upper inserting/receiving part mating with the upper receiving/inserting part of the tension member and being formed at the lower face with an lower inserting/receiving part mating with the lower receiving/inserting part of the tension member, wherein through the fitting of the tension member into the fitting part of each of the blocks, the plurality of blocks are securely engaged to the tension member so that both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission. In this V-belt, each of the blocks is formed of a resin part constituting at least the contact part and the fitting part, and a reinforcement at least partly embedded in the resin part and made of a material having a higher modulus of elasticity than the resin part, the back of the fitting part of each of the blocks in the direction of insertion of the tension member is formed with an innermost abutment surface against which an abutment part of the tension member located at a leading end thereof in the direction of insertion of the tension member abuts, the fitting part is formed with an indent by downwardly recessing a portion of the resin part located between the lower inserting/receiving part and the innermost abutment surface, and the relationship $\theta 2-3 < \theta 1 < \theta 2+3$ is established between an innermost abutment surface angle $\theta 1$ made by a portion of the innermost abutment surface located between corresponding positions thereof to the lower end of the upper inserting/receiving part of the fitting part and the upper end of the lower inserting/receiving part of the fitting part and a vertical plane along the length of the belt and a belt side face angle $\theta 2$ made by the contact parts of the right and left side surfaces of each of the blocks and the vertical plane.

Thus, the same effects as those of the first-mentioned V-belt can be obtained.

DESCRIPTION OF THE PREFERRED EMBODIMENTS

Hereinafter, embodiments of the present invention will be described with reference to the drawings.

Embodiment 1

Figure 7:
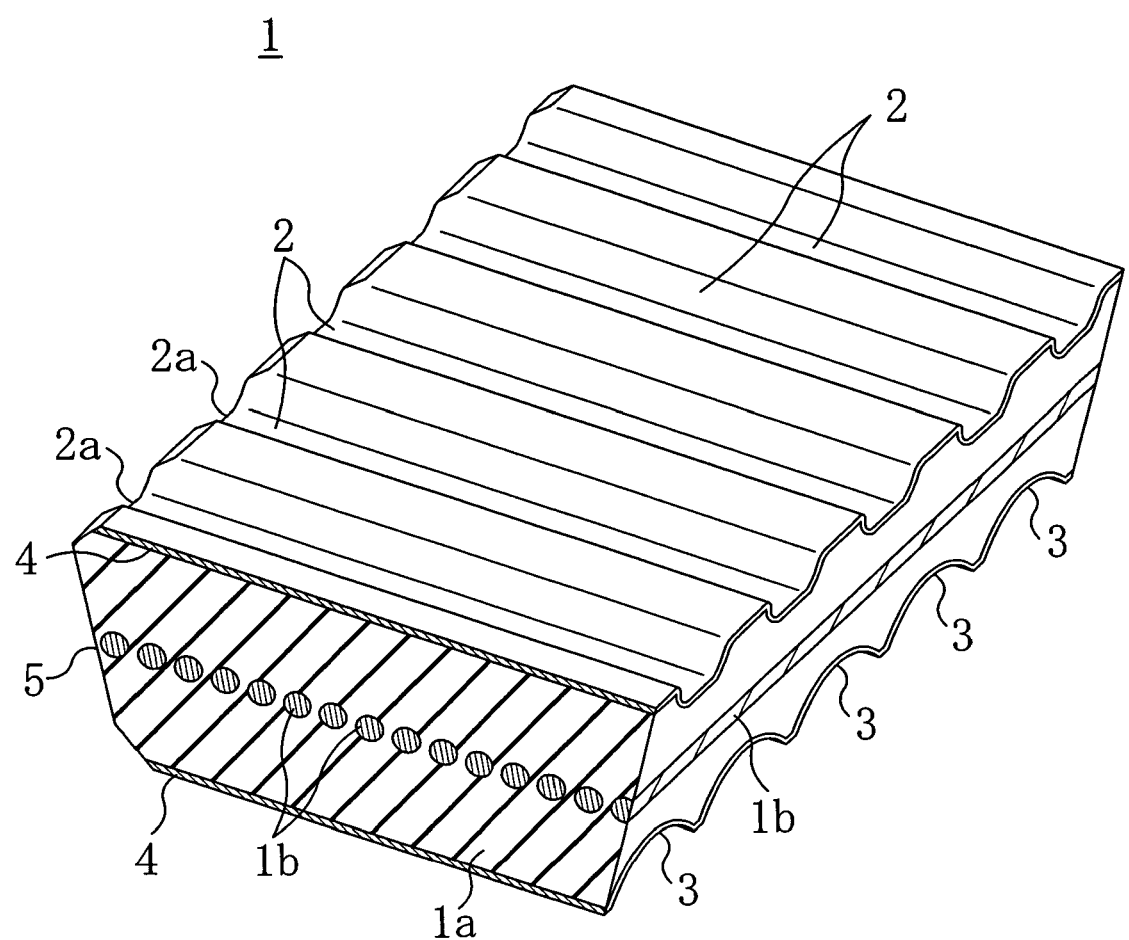
FIG. 7 is a perspective view of a tension member.
Figure 8:
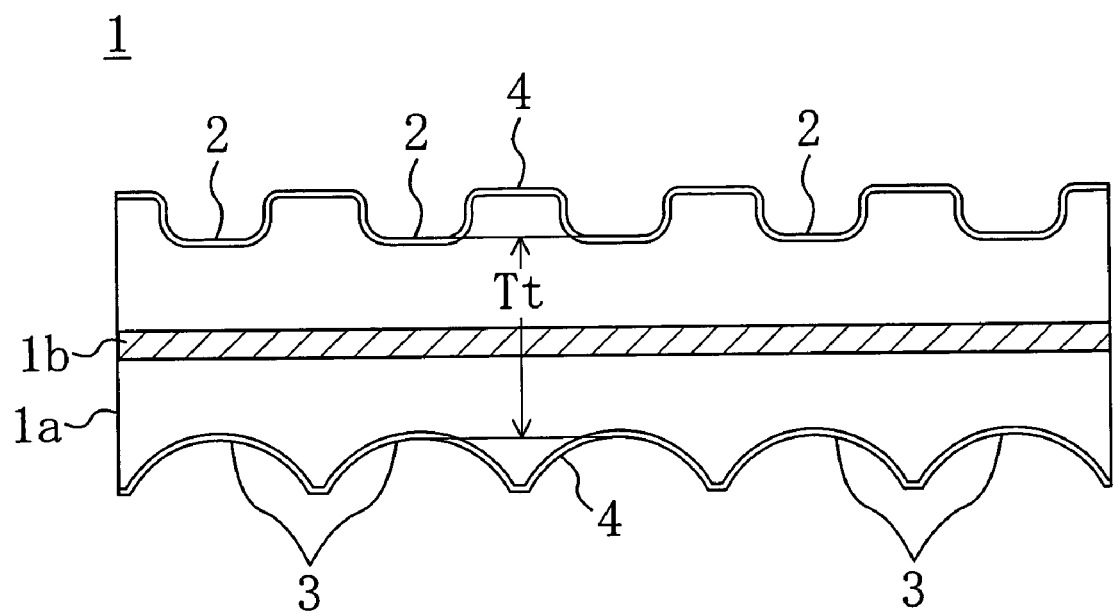
FIG. 8 is a side view of the tension member.
Figure 9:
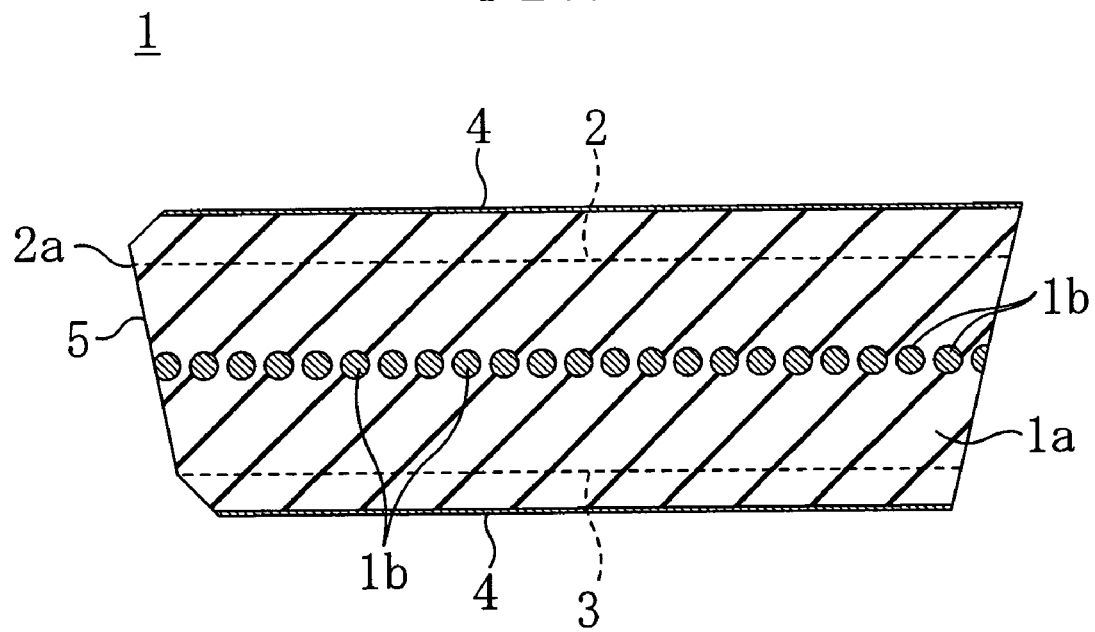
FIG. 9 is a cross-sectional view of the tension member.
Figure 10:
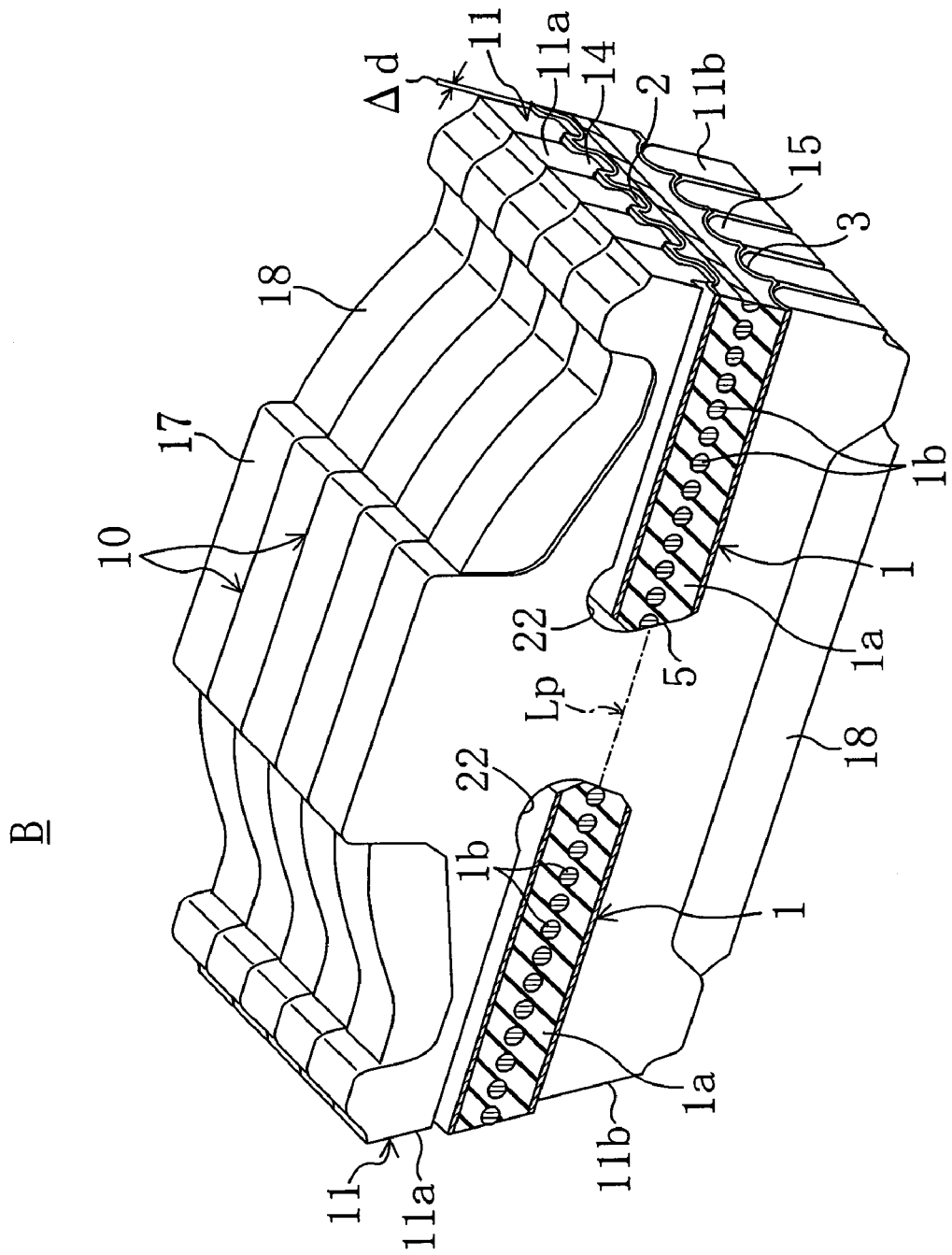
FIG. 10 is a fragmentary perspective view of the heavy duty power transmission V-belt.

FIG. 10 shows a heavy duty power transmission V-belt B according to a first embodiment of the present invention. This belt B includes bilaterally paired two endless tension members 1 and 1, and a plurality of blocks securely engaged in series longitudinally of the belt B with the paired tension members 1 and 1. As also shown in FIGS. 7 to 9, each tension member 1 is formed so that a cord (load carrying cord) 1b of high strength and high modulus of elasticity, such as a cord made of aramid fibers, are embedded within a shape-retaining rubber layer 1a made of a hard rubber so as to be disposed spirally therein. In the top surface of each tension member 1, a plurality of groove-like upper recesses 2, 2, . . . as upper receiving parts are formed at regular intervals longitudinally of the belt B to extend widthwise of the belt B at their positions where the respective blocks 10 are engaged therewith. In the bottom surface of each tension member 1, a plurality of lower recesses 3, 3, . . . as lower receiving parts are formed at regular intervals in correspondence with the plurality of upper recesses 2, 2, . . . to extend widthwise of the belt B. Fabrics 4 and 4 are adhered to the top and bottom surfaces of the tension member 1 for the purpose of improving wear resistance, respectively.

Used as a hard rubber forming the shape-retaining rubber layer 1a is a rubber made of, for example, zinc methacrylate-reinforced H-NBR into which short fibers such as aramid fibers or nylon fibers are additionally mixed overall for the purpose of reinforcement thereby obtaining excellent heat resistance and less elastic deformability. The hard rubber requires a hardness of 75° or more when measured by a JIS-C hardness meter.

Figure 3:
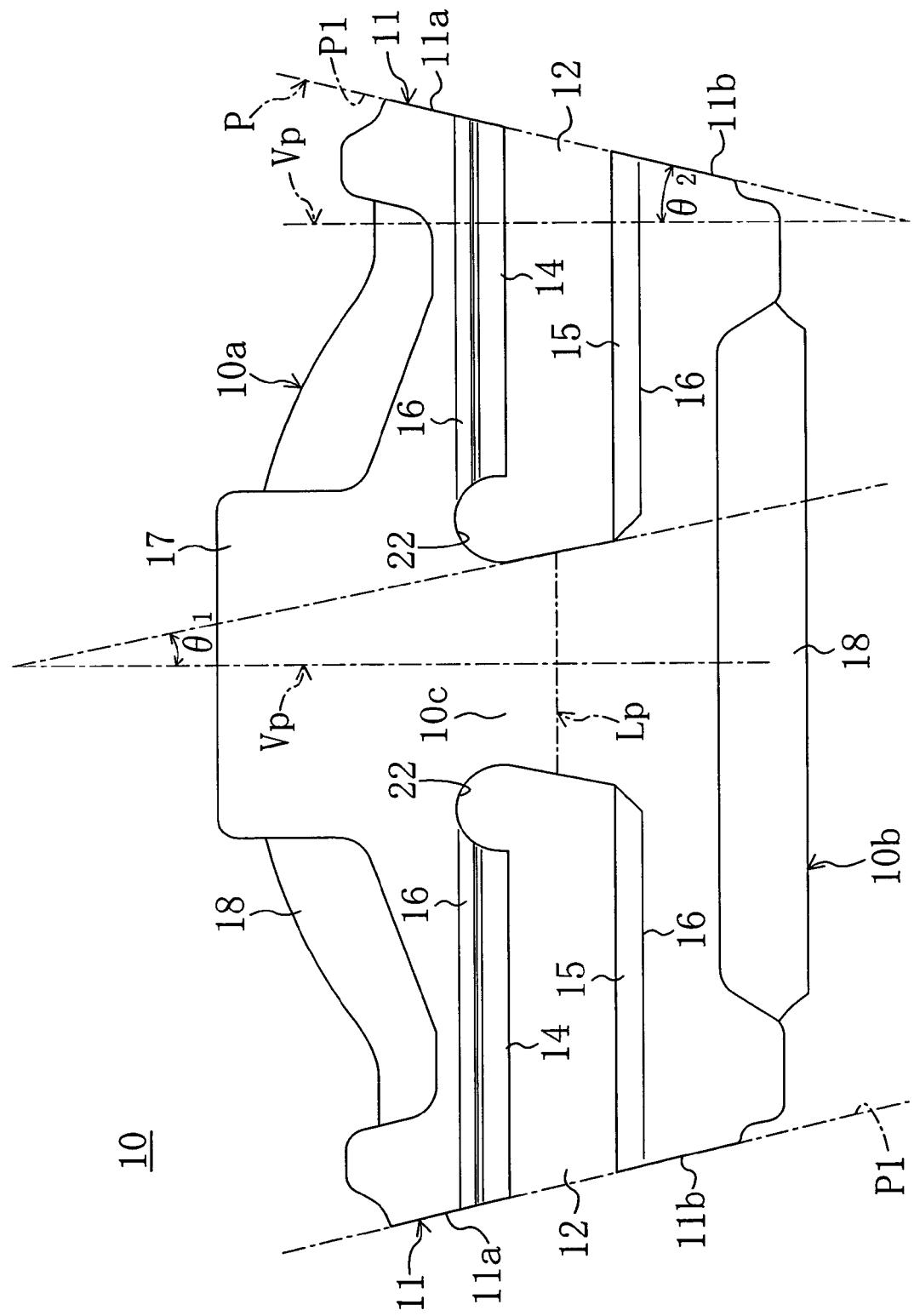
FIG. 3 is a front view of each block.
Figure 4:
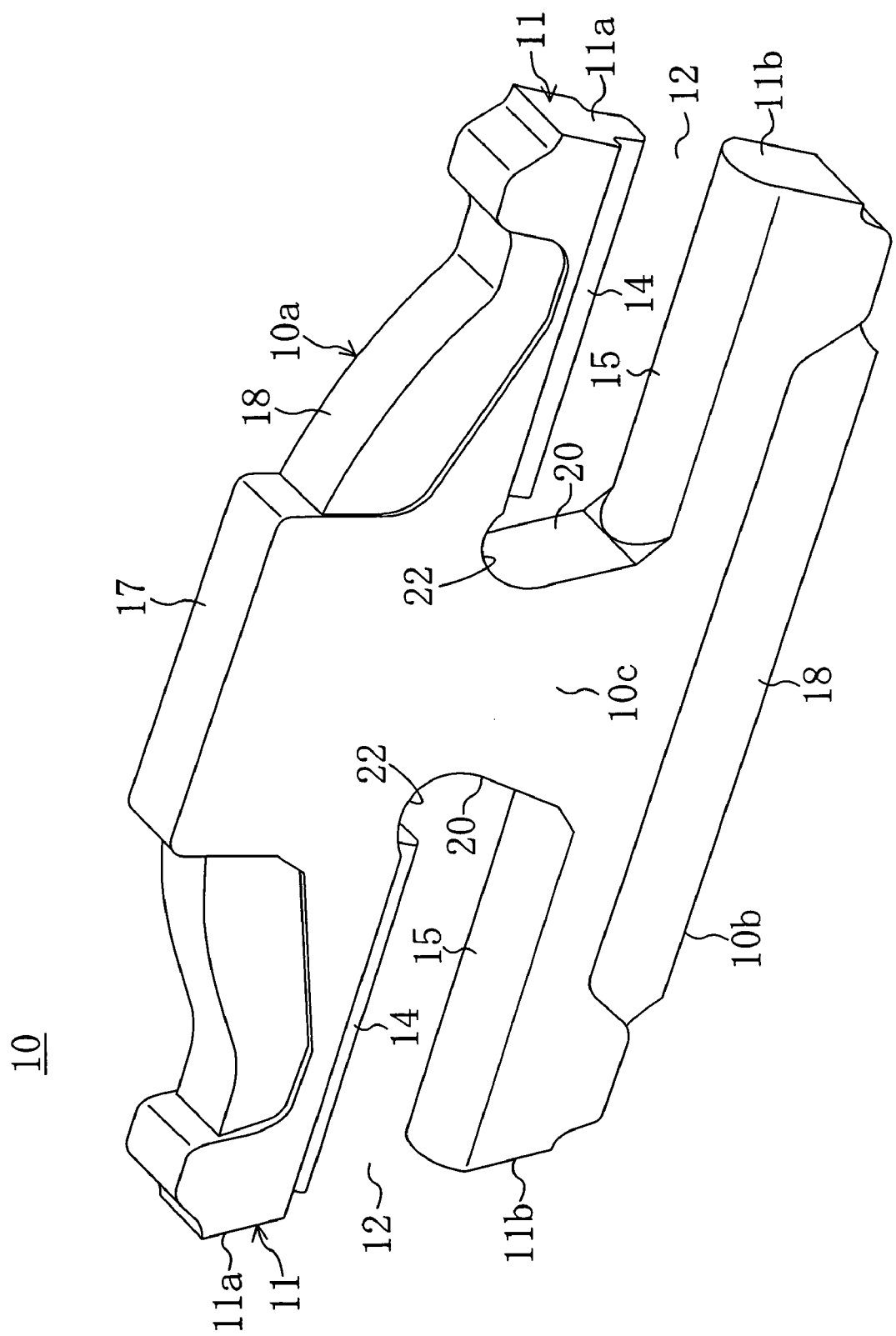
FIG. 4 is a perspective view of each block.

As also shown FIGS. 3 and 4, each block 10 has a pair of indented slot-like fitting parts 12 and 12, formed in both lateral sides thereof along the width of the belt B, for fitting with the respective tension members 1, 1 by press insertion from the widthwise direction. Portions of the right and left side surfaces other than the fitting parts 12 and 12 constitute contact parts 11 and 11 which are brought into contact with the groove side faces P1 and P1 of a V-pulley P. Each contact part 11 is formed of an upper contact part 11a located above the fitting part 12 and a lower contact part 11b located below the fitting part 12. The belt angle made by the right and left contact parts 11 and 11 of each block 10 is set to be equal to the angle made by both the groove side faces P1 and P1 of the pulley P.

Each block 10 consists of upper and lower beams 10a and 10b extending widthwise (transversely) of the belt B and a center pillar 10c vertically connecting between laterally middle portions of both the beams 10a and 10b, and thereby forms an approximately H-shape as a whole. Through the press insertion of the tension members 1 and 1 into the respective fitting parts 12 and 12 of each block 10, the blocks 10, 10, . . . are securely engaged in series longitudinally of the belt B with the tension members 1 and 1.

More specifically, in the upper wall surface of each fitting part 12 of each block 10, an upper ridge 14 as an upper inserting part is formed for mating with a corresponding upper recess 2 in the top surface of the tension member 1. In the lower wall surface of the fitting part 12, a lower ridge 15 as a lower inserting part is formed for mating with a corresponding lower recess 3 in the bottom surface of the tension member 1. These upper and lower ridges 14 and 15 in the same fitting part 12 are disposed in parallel with each other. Through the mating engagement of the upper and lower ridges 14 and 15 of each block 10 with the upper and lower recesses 2 and 3 of the tension member 1, the blocks 10, 10, . . . are securely engaged with the tension members 1 and 1 by press insertion so as to be linked together longitudinally of the belt B. In this engagement relation, the outside surfaces of each tension member 1 (only the right side surface shown in FIGS. 7 and 9) and the contact parts 11 and 11 forming the respective side surfaces of each block 10 contact with the groove side faces P1 and P1 of the pulley P. In this manner, power transmission is carried out through the mating engagement of the upper and lower ridges (inserting parts) 14 and 15 of each block 10 with the upper and lower recesses (receiving parts) 2 and 3 of each tension member 1.

Figure 5:
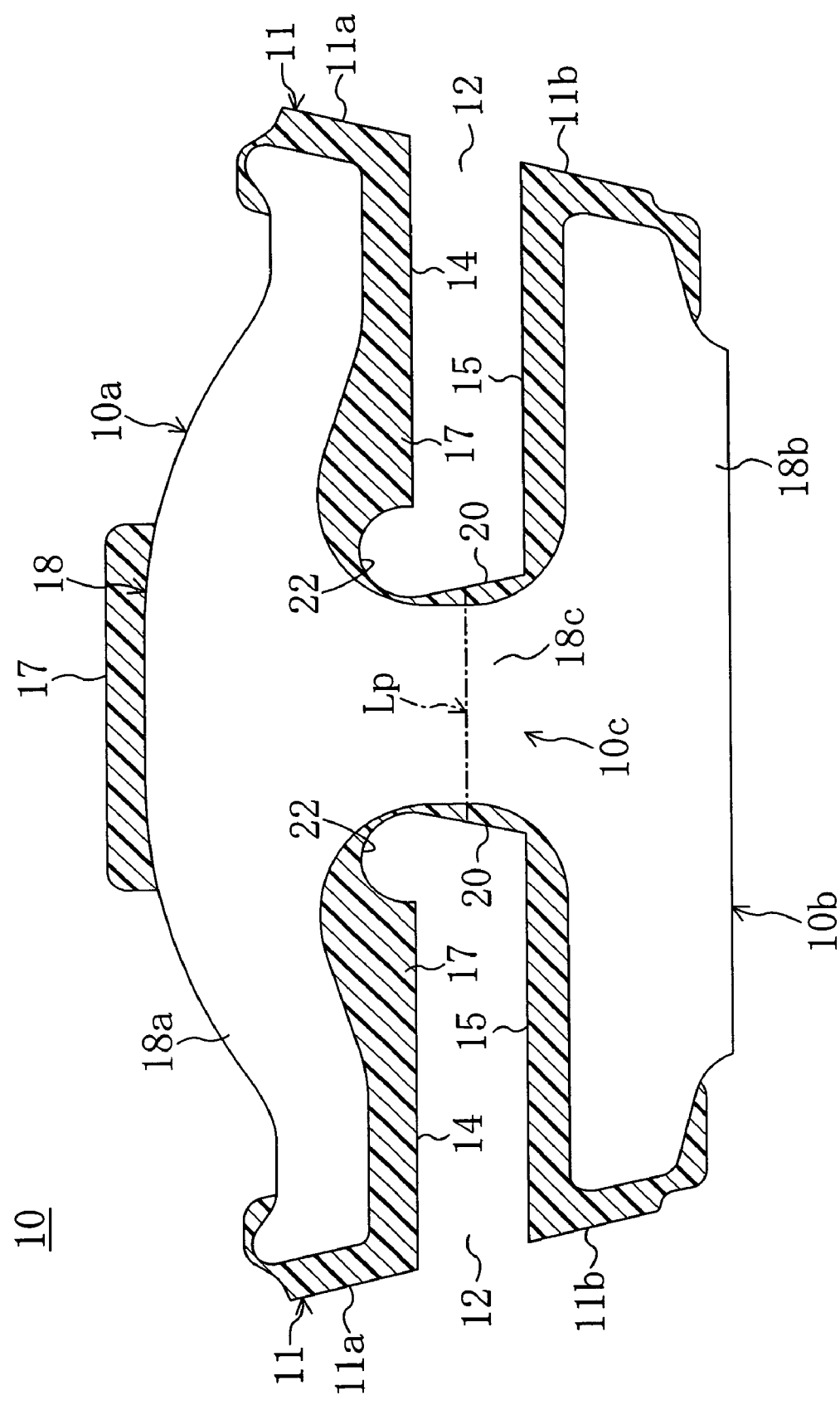
FIG. 5 is a cross-sectional view of each block.
Figure 6:
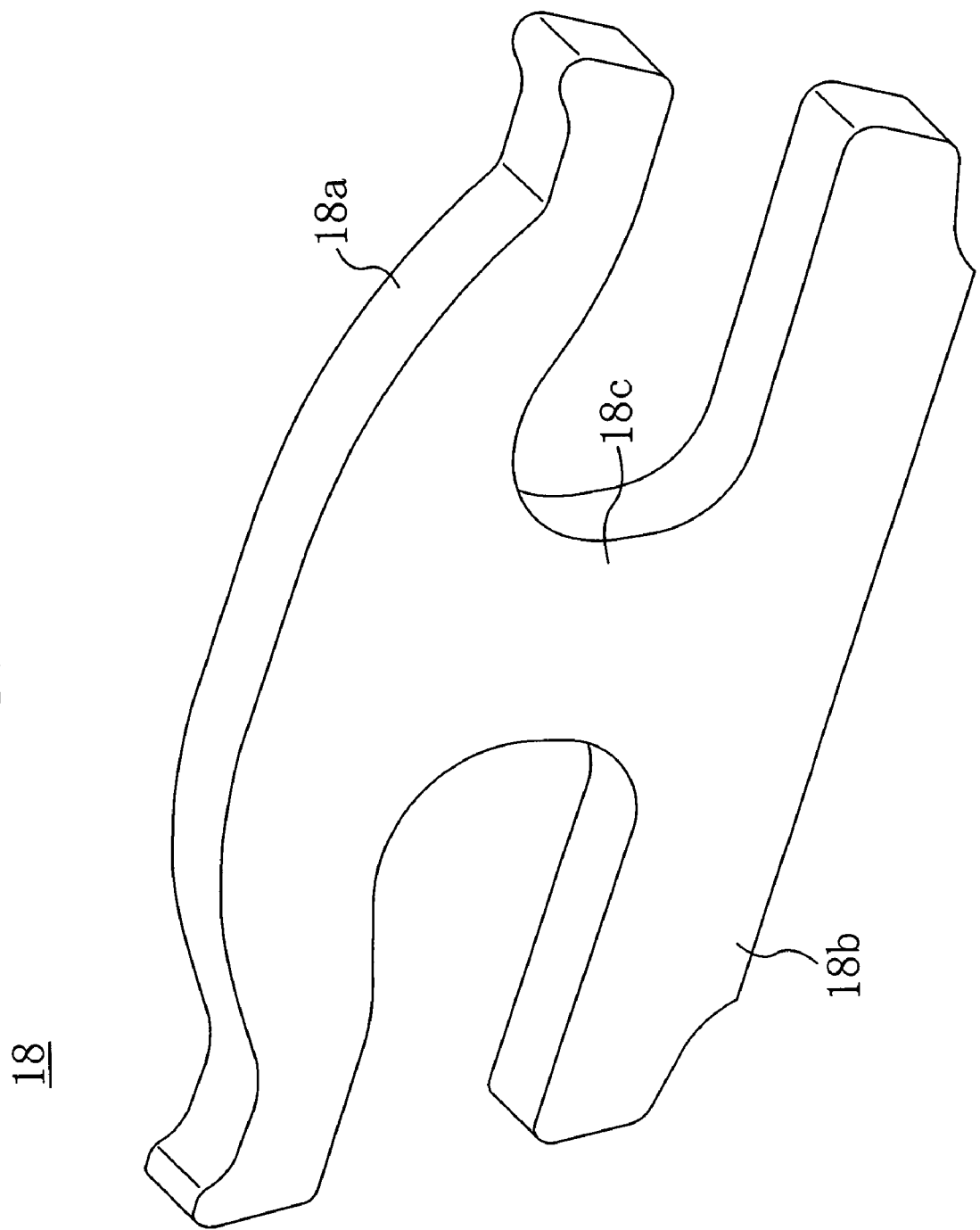
FIG. 6 is a perspective view of a reinforcement.

As also shown in FIG. 5, each block 10 is formed by a resin part 17 made of a hard resin material, and a reinforcement 18 embedded substantially centrally within the block 10 and made of a material having a higher modulus of elasticity than the resin part 17, such as a lightweight aluminum alloy. Part of the reinforcement 18 is embedded within the resin part 17, for example, at the upper and lower ridges 14 and 15 of each fitting part 12 (mated parts with the tension member 1) and the contact parts 11 and 11 in both lateral side surfaces of each block 10 (sliding engagement parts with the side faces P1, P1 of the pulley groove), namely, these parts of the block 10 are made of the resin part 17, and therefore does not appear on the surfaces of the block 10. However, the other part of the reinforcement 18 is exposed on the surfaces of the block 10 (the entire reinforcement 18 may be embedded with the resin part 17 so as not to be exposed on the surfaces of the block 10). As shown in FIG. 6, the reinforcement 18 consists of upper and lower beams 18a, 18b extending widthwise (transversely) of the belt B and a center pillar 18c vertically connecting between laterally middle portions of both the beams 18a, 18b, and is thereby formed in substantially H-shape.

Figure 1:
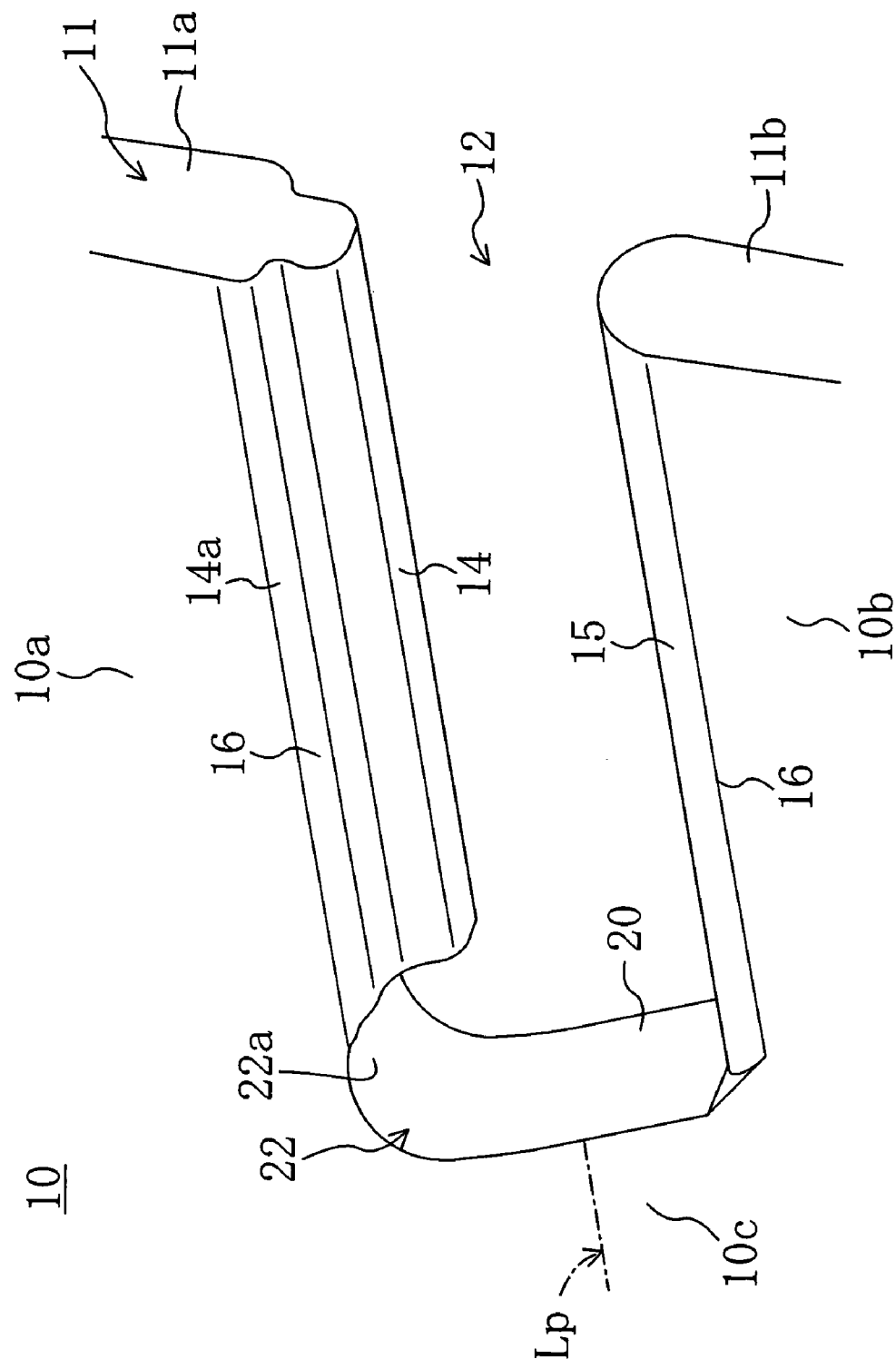
FIG. 1 is an enlarged perspective view showing a fitting part of each block of a heavy duty power transmission V-belt according to a first embodiment of the present invention.

The edges of each of the upper and lower ridges 14 and 15 of each fitting part 12 that border on the front and rear surfaces of each block 10 in the belt lengthwise direction are rounded off in an arcuate cross-section to form rounded portions 16 and 16 (see FIGS. 1 and 8).

Figure 2:
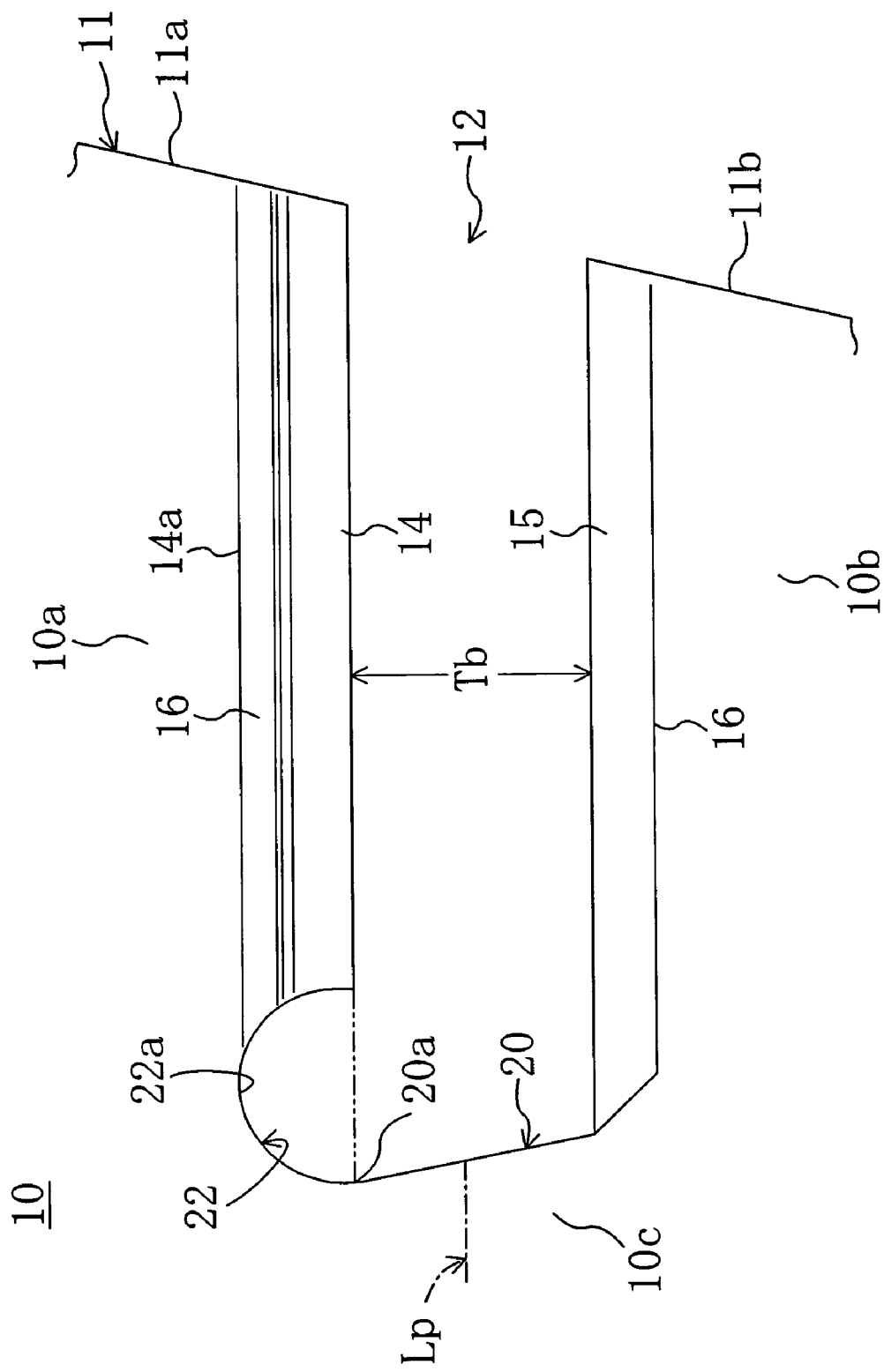
FIG. 2 is an enlarged front view showing the fitting part of each block.

As shown in an enlarged manner in FIGS. 1 and 2, each of the backs of the right and left fitting parts 12 and 12 of each block 10 in the direction of insertion of the tension member 1 is formed with an innermost abutment surface 20. This innermost abutment surface 20 is located to range both upward and downward from the pitch line Lp of the belt B (the level of the cord 1b of the tension member 1).

The innermost abutment surface 20 is inclined toward the deepest point of the fitting part 12 (the block center in the belt widthwise direction) with the approach to the top. As shown in FIG. 3, the relationship $\theta 2-3<\theta 1<\theta 2+3$ is established between an innermost abutment surface angle $\theta 1$ (unit: °) and a belt side face angle $\theta 2$ (unit: °), wherein the innermost abutment surface angle $\theta 1$ is the angle made by a portion of the innermost abutment surface 20 located between the corresponding positions to the upper and lower recesses 2 and 3 of the tension member 1, or between the corresponding positions to the lower end of the upper ridge 14 and the upper end of the lower ridge 15, and a vertical plane Vp (a plane parallel to the plane passing through the widthwise center of the belt B), and the belt side face angle $\theta 2$ is the angle made by the right and left contact parts 11 and 11 of each block 10 and the vertical plane Vp.

If the relation of the innermost abutment angle $\theta 1$ of the innermost abutment surface 20 with the belt side face angle $\theta 2$ is $\theta 1 \leq \theta 2-3$ or $\theta 1 \geq \theta 2+3$, the difference between the innermost abutment surface angle $\theta 1$ and the belt side face angle $\theta 2$ will be excessively large. If the difference becomes excessively large, heat production of the moving belt B is increased so that the tension member 1 causes local wear. In this embodiment, the relationship between $\theta 1$ and $\theta 2$ is therefore established as $\theta 2-3<\theta 1<\theta 2+3$, and in particular, $\theta 1=\theta 2$ will be preferable.

Out of both the side end surfaces in the belt widthwise direction of each tension member 1, the inside end surface facing the back of the fitting part 12 of the block 10 is formed into an abutment part 5 having an inclined surface closer to the deepest point of the fitting part 12 with the approach to the top. The angle of inclination of the abutment part 5 is substantially equal to the angle of inclination of the innermost abutment surface 20. When the tension member 1 is press-inserted into the fitting part 12 of each block 10, the abutment part 5 abuts on the innermost abutment surface 20.

Furthermore, the mating thickness Tt between the upper and lower recesses 2, 3 of the tension member 1, i.e., as shown in FIG. 8, the distance between the bottom surface of the upper recess 2 (more specifically, the top surface of the upper fabric 4) and the bottom surface of the corresponding lower recess 3 (more specifically, the bottom surface of the lower fabric 4), is previously set slightly (for example, about 0.03 to 0.15 mm) larger than the mating clearance Tb of each block 10, i.e., as shown in FIG. 1, the distance between the lower end (peak) of the upper ridge 14 and the upper end (peak) of the lower ridge 15 of each block 10. In short, Tt>Tb holds in this case. Under this setting, the tension member 1 is incorporated into each block 10 while thicknesswise compacted by the block 10 in assembling individual blocks 10 onto the tension member 1. In this manner, an interference is provided between Tt and Tb.

Figure 11:
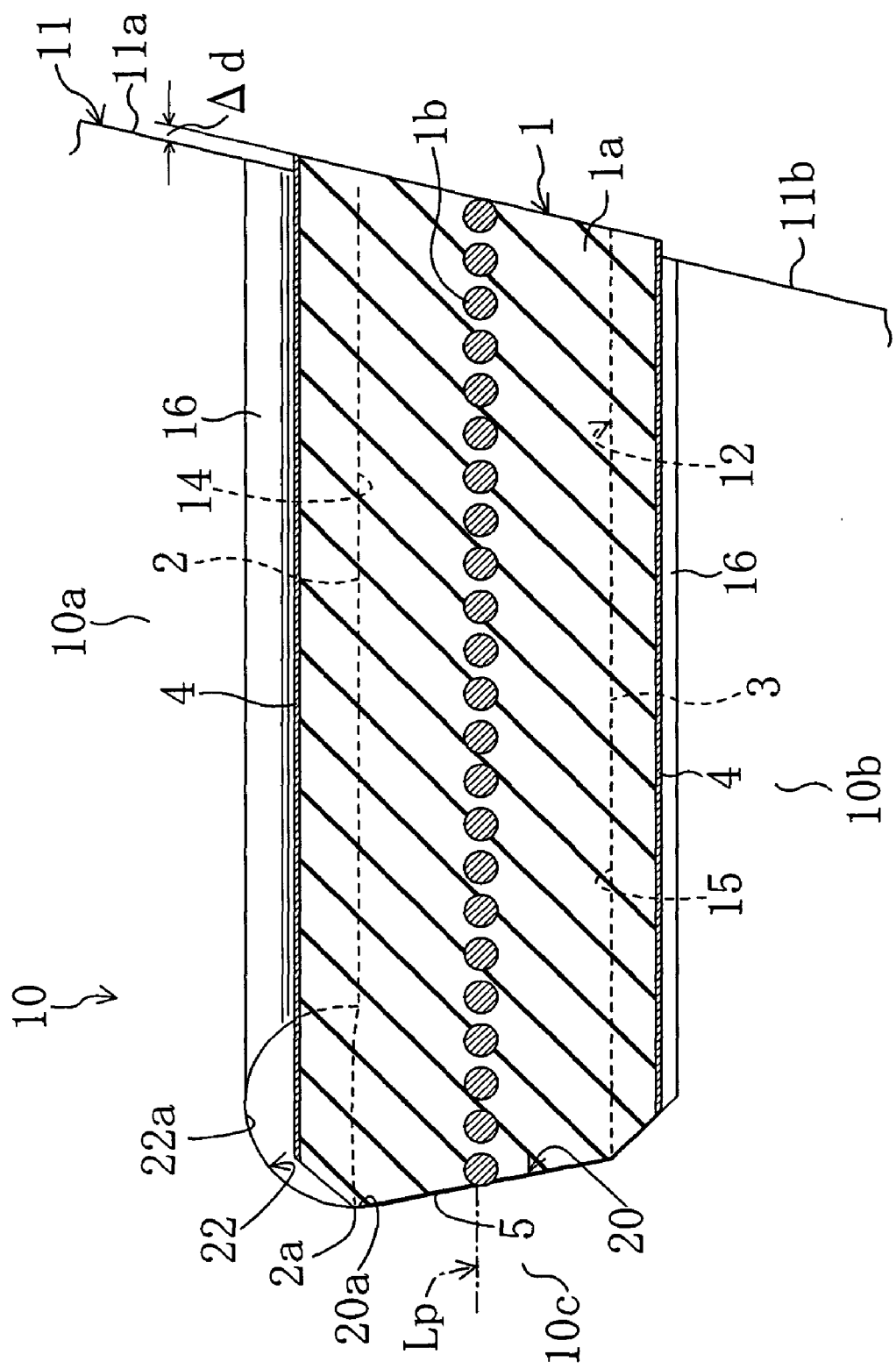
FIG. 11 is an enlarged cross-sectional view showing the tension member press-inserted into the fitting part of the block, in which an innermost side portion of the tension member becomes thicker than an opening side portion thereof since the inner end portion of an upper recess of the tension member is in an indent of the block and is not compressed.

As shown in FIGS. 10 and 11, in both lateral side faces of the belt B, both the outside end surfaces of the tension members 1, 1 project slightly (for example, 0.03 to 0.15 mm) beyond the respective resin-made contact parts 11, 11 of each block 10. In order to implement the projection, a projection allowance Δd is provided for each tension member 1. The projection allowance Δd is freely changeable by regulating the pitch width of the tension member 1 (the width thereof on the pitch line of the cord 1b) relative to the fitting pitch width of the fitting part 12 at which the block 10 is mated with the tension member 1 (i.e., the depth of the fitting part 12 on the pitch line of the cord 1b of the tension member 1 fitted into the fitting part 12). Each tension member 1 is press-inserted into the fitting part 12 of each block 10. For the integrity of the press insertion, the tension member 1 is required to be press-inserted into the fitting part 12 with a force larger than applied thereto from the pulley in actual use of the belt B. The projection allowance Δd is easily measurable by scanning both the side faces of the assembled belt B with a contour measuring instrument.

Furthermore, the back of the fitting part 12 of each block 10 in the direction of insertion of the tension member 1 is provided at the upper corner with an indent 22 of substantially arcuate shape formed by upwardly recessing a portion of the resin part 17 located between the upper ridge 14 (upper inserting part) and the innermost abutment surface 20. As shown in FIG. 1, the indent 22 and the upper end 20a of the innermost abutment surface 20 are connected together by a curved surface to merge smoothly into each other.

Also, the uppermost end 22a of the indent 22 is located above the upper end 14a of the upper ridge (upper inserting part) 14. In addition, as shown in FIG. 11, with the tension member 1 fitted into the fitting part 12 of the block 10, an edge 2a which is the boundary between the bottom of the upper recess 2 and the abutment part 5 is located in the indent 22 of the block 10.

As described so far, according to the present embodiment, each of the backs of the fitting parts 12 and 12 of each block 10 of the belt B in the direction of insertion of the tension member 1 is formed with an innermost abutment surface 20, and a portion of the resin part 17 located between the upper ridge 14 and the innermost abutment surface 20 of the fitting part 12 is formed with an upwardly recessed indent 22. As a result of the formation of the indent 22, no edge is formed between the innermost abutment surface 20 and the upper ridge 14. Therefore, stress which would otherwise concentrate on the edge can be distributed. This avoids that the resin part 17 produces a crack because of stress concentration on the edge, and that beginning at the leading end of the crack, the reinforcement 18 produces a crack, and in turn prevents fracture of the upper beam 18a of the reinforcement 18, resulting in significantly enhanced resistance against failure of the block 10.

Furthermore, the mating thickness Tt between the bottom surfaces of the upper and lower recesses 2, 3 of each tension member 1 is larger than the mating clearance Tb between the upper ridge 14 and the lower ridge 15 of each block 10, and the upper and lower ridges 14 and 15 of each block 10 are fitted into the upper and lower recesses 2 and 3 of the tension member 1, respectively, while compressively elastically deformed. In this manner, an interference is provided in which the relationship Tt/Tb between the mating thickness Tt between the upper and lower recesses 2, 3 of each tension member 1 and the mating clearance Tb between the upper ridge 14 and the lower ridge 15 of each block 10 is established as 1<Tt/Tb. When the temperature of the entire belt B is increased because of differences in thermal expansibility among materials forming the block 10, or when the shape-retaining rubber layer 1a of the tension member 1 has a larger thermal expansibility than the resin part 17 and the reinforcement 18 made of aluminum or the like of the block 10 and therefore the temperature of the entire belt B is increased, the thickness of the tension member 1 is relatively increased. Thus, the Tt/Tb value or interference is excessively increased. As a result, the shape-retaining rubber layer 1a constituting the tension member 1 may undergo permanent deformation, and the block 10 may take an excessive force because of a compressive force produced in the fitting part 12. According to this embodiment, however, the indent 22 between the innermost abutment surface 20 and the upper ridge 14 of the fitting part 12 of each block 10 creates a space at the back of the fitting part 12. Therefore, even when the tension member 1 thermally expands, the amount of expansion of the tension member 1 is released into the space so that only a low load is applied to the block 10. This prevents early introduction of permanent deformation of the shape-retaining rubber layer 1a of the tension member 1 and occurrence of an excessive force in the block 10 due to a compressive force produced in the fitting part 12.

Furthermore, the value Tt/Tb can be maintained at a value larger than 1 for a long time to hold a stable interference, which prevents the occurrence of wobbling. When the interference has such a dimension that the shape-retaining rubber layer 1a forming the tension member 1 would otherwise produce permanent deformation, excessive deformation of the rubber part may increase heat production and in turn further increase the temperature of the belt B, thereby inviting thermal expansion and thermal deterioration of the rubber part. According to this embodiment, however, these adverse effects can also be prevented.

Since the indent 22 has substantially an arcuate shape, the curvature of the indent 22 is uniform as a whole. Therefore, even when the direction of stress application is changed, stress concentration can be avoided constantly.

Furthermore, the indent 22 and the upper end 20a of the innermost abutment surface 20 are connected together by a curved surface to merge smoothly into each other. The indent 22 and the upper end 20a of the innermost abutment surface 20 are thus connected by a curved surface less likely to cause stress concentration, which provides reduced stress.

Furthermore, since the uppermost end 22a of the indent 22 is located above the upper end 14a of the upper ridge 14, the indent 22 can be formed in a size that can accommodate the entire height of the upper ridge 14, which can distribute stress that would otherwise concentrate on the edge between the innermost abutment surface 20 and the upper ridge 14.

Furthermore, with the tension member 1 fitted into the fitting part 12 of the block 10, the edge 2a of the upper recess 2 of the tension member 1 which borders on the abutment part 5 is located in the indent 22 of the block 10. Therefore, as shown in FIG. 11, part of the bottom of the upper recess 2 located toward the back of the fitting part 12 does not interfere with the block 10 in the indent 22. As a result, when the tension member 1 is press-inserted into the fitting part 12, only that part of the upper recess 2 is not compressed so that the portion of the tension member 1 on the back side of the fitting part 12 has a larger thickness than the portion thereof on the opening side of the fitting part 12. With this thickness difference, the portion of the tension member 1 on the back side of the fitting part 12 is snagged on the inner end of the upper ridge 14, and therefore the tension member 1 is difficult to disengage from the block 10.

Figure 12:
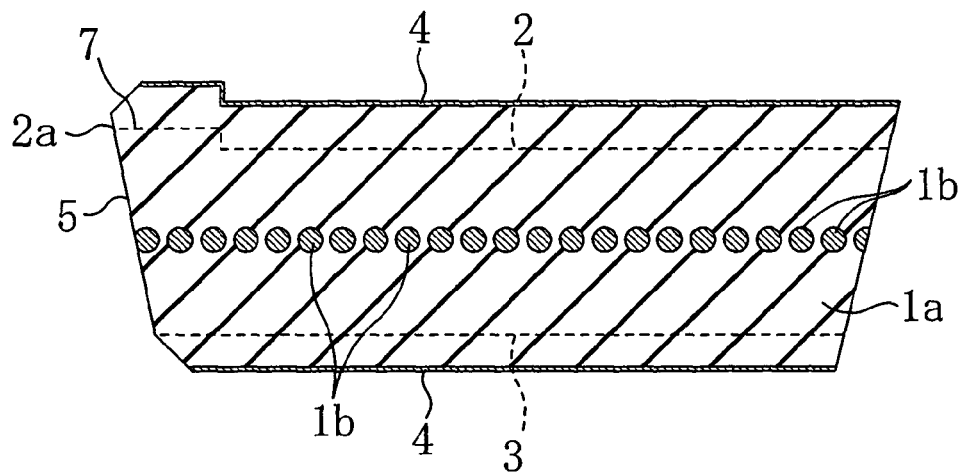
FIG. 12 is a view of the tension member which corresponds to FIG. 9, wherein the inner end portion of the upper recess is expanded to form a step.
Figure 13:
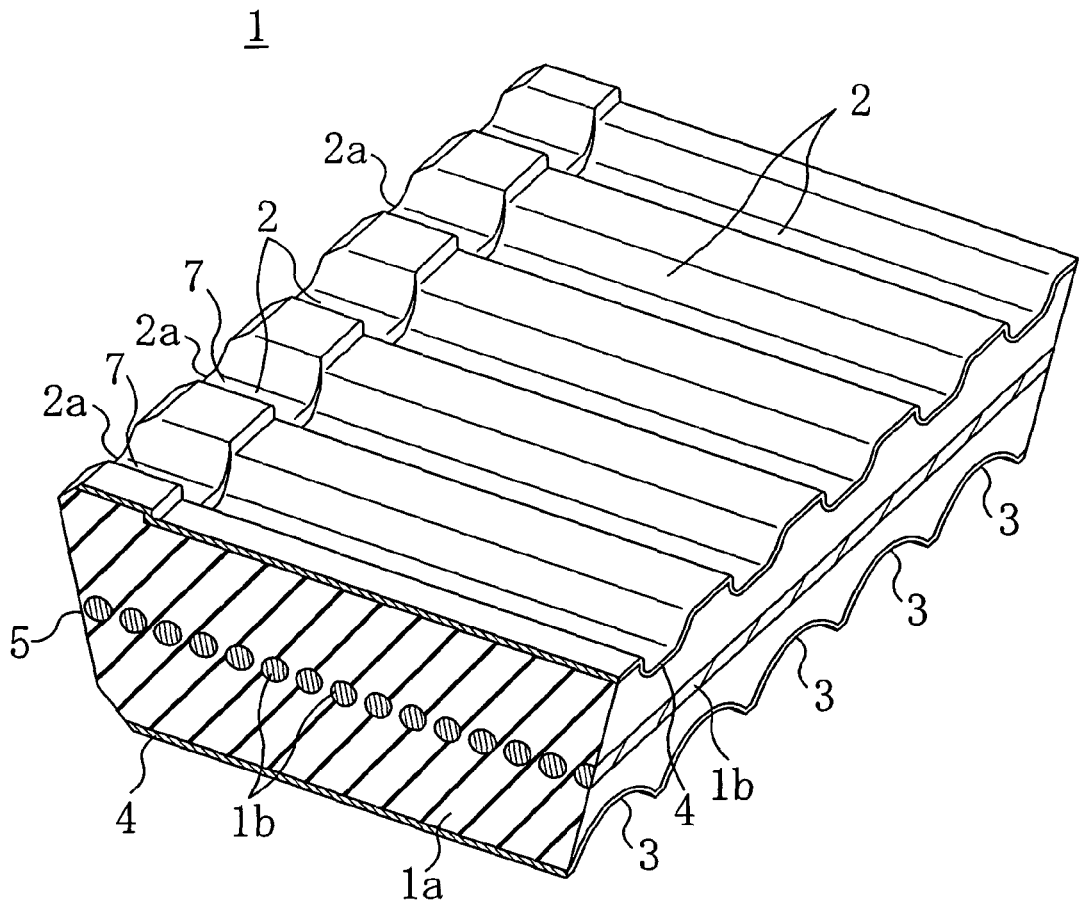
FIG. 13 is a view of the tension member which corresponds to FIG. 7, wherein the inner end portion of the upper recess is expanded to form a step.

When a portion of the shape-retaining rubber layer 1a of the tension member 1 receiving compressive forces from the block 10 causes deterioration such as deformation or wear with the use of the belt B, a portion of the tension member 1 on the back side of the fitting part 12 becomes larger in thickness than the portion thereof on the opening side of the fitting part 12 to form a step 7 as shown in FIGS. 12 and 13. This step 7, even if wobbling occurs between the block 10 and the tension member 1, restricts movements of the tension member 1 in the directions of insertion and withdrawal of the block 10. As a result, oscillation of the block 10 relative to the tension member 1 can be damped to prevent early failure of the block 10. Furthermore, there can be prevented heat production due to friction between the tension member 1 and the fitting part 12 resulting from the oscillation of the block 10, temperature rise, rubber deterioration and occurrence of a crack in the tension member 1 due to the heat production, failure of the block 10 due to the crack and fracture of the tensile cord 1b of the tension member 1.

In the innermost abutment surface 20 of the fitting part 12 of each block 10, a region located above the position corresponding to the upper recess (upper receiving part) 2 of the tension member 1 fitted into the fitting part 12 and a region located below the position corresponding to the lower recess (lower receiving part) 3 of the tension member 1 each have a small-rib shape that has a large modulus of deformation under bearing stress and therefore does not stand a large bearing stress. On the other hand, an intermediate region of the innermost abutment surface 20 located between the positions corresponding to the upper and lower recesses (upper and lower receiving parts) 2 and 3 of the tension member 1 is formed into a continuous surface near to the cord 1b of the tension member 1, can stand a large bearing stress, and in actuality mainly stand bearing stresses. In addition, the relationship $\theta 2-3<\theta 1<\theta 2+3$ is established between an innermost abutment surface angle $\theta 1$ (unit: °) and a belt side face angle $\theta 2$ (unit: °), wherein the innermost abutment surface angle $\theta 1$ is the angle made by a portion of the innermost abutment surface 20 located between the corresponding positions to the upper and lower recesses 2 and 3 of the tension member 1, or between the corresponding positions to the lower end of the upper ridge 14 and the upper end of the lower ridge 15, and the vertical plane Vp, and the belt side face angle $\theta 2$ is the angle made by the right and left contact parts 11 and 11 of each block 10 and the vertical plane Vp. Therefore, without the reinforcement 18 having the shape that the abutment surface is cut back to a great extent at the root of the upper beam 18a as in the case where the innermost abutment surface 20 is inclined entirely, the occurrence of local wear of the tension member 1 can be prevented, and heat production of the belt B can be reduced, thereby providing improved durability of the heavy duty power transmission V-belt B.

Embodiment 2

Figure 14:
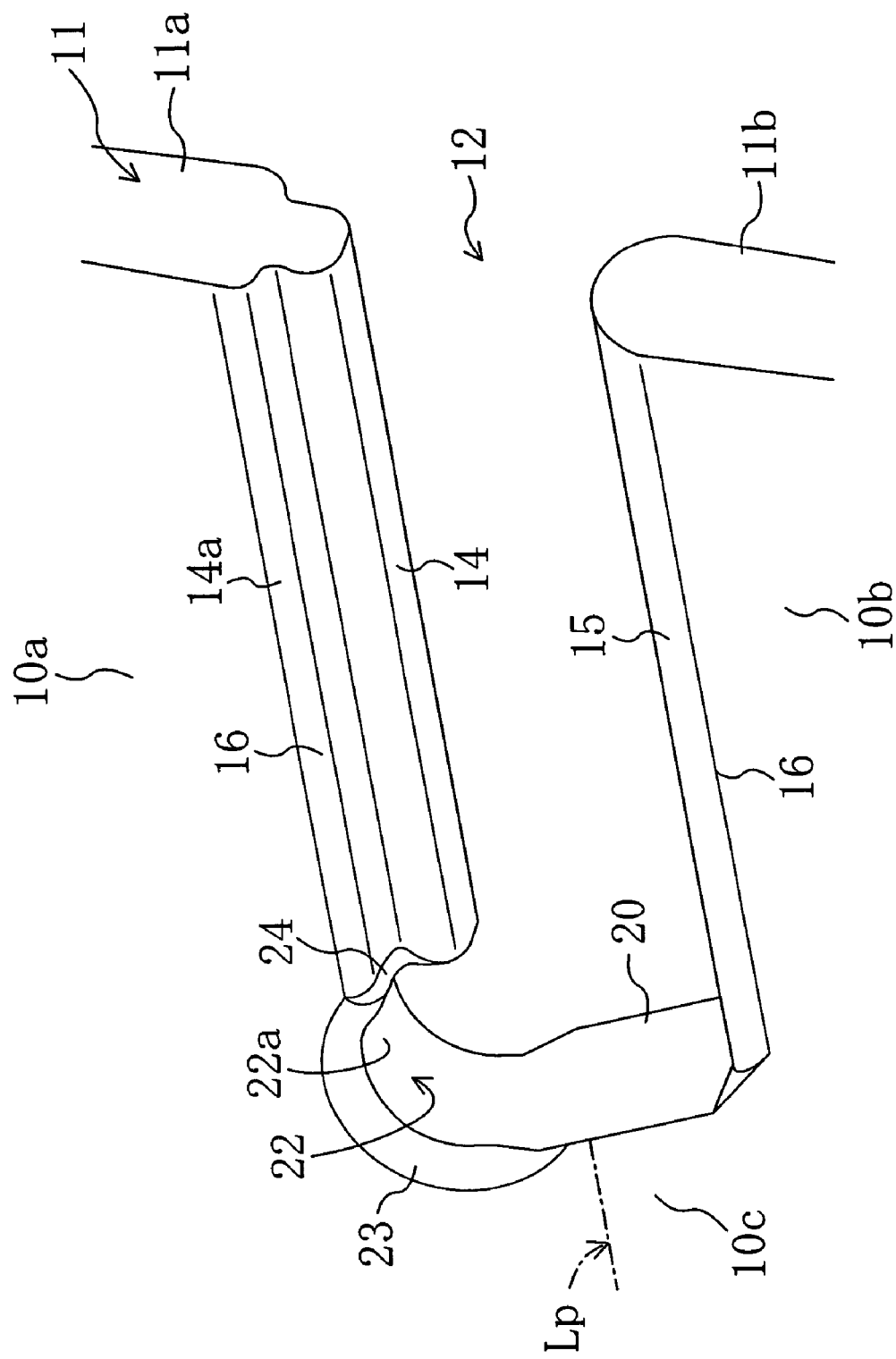
FIG. 14 is a view corresponding to FIG. 1, and showing a second embodiment of the present invention.
Figure 15:
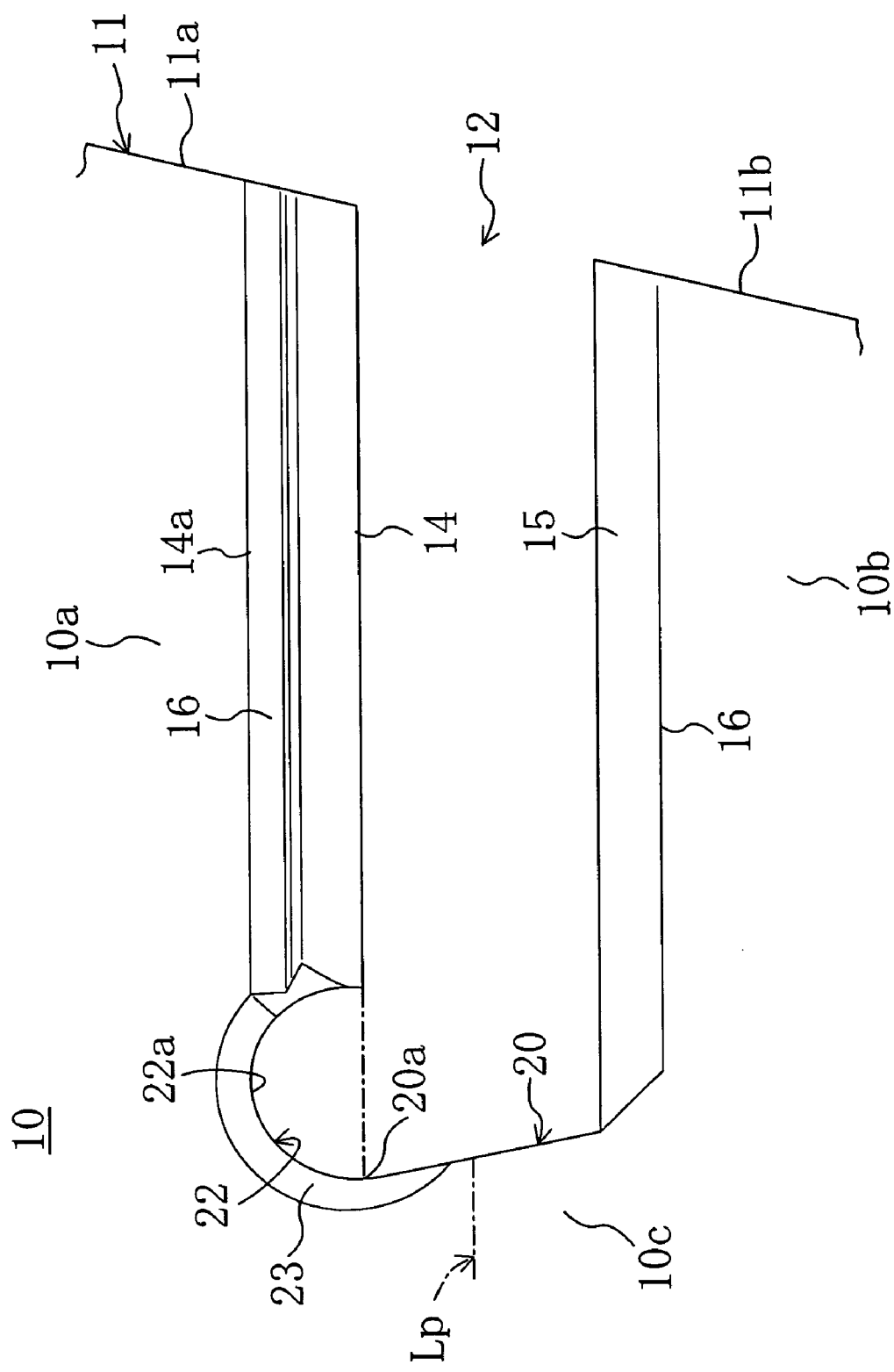
FIG. 15 is a view corresponding to FIG. 2, and showing the second embodiment.

FIGS. 14 and 15 show a second embodiment of the present invention (note that in embodiments described hereinafter, elements similar to those shown in FIGS. 1 to 13 are identified by similar reference numerals and the detailed description thereof will be omitted), wherein both widthwise ends of the indent 22 are chamfered.

Specifically, in the present embodiment, edges between the indent 22 of each fitting part 12 of each block 10 and both the front and rear surfaces of the block 10 in the belt lengthwise direction are chamfered in an arcuate cross-section, and thereby chamfers 23 and 23 are formed. Each chamfer 23 connects via a smooth curved surface to the rounded portion 16 formed at a corresponding one of the edges between the upper ridge 14 of the fitting part 12 and both the front and rear surfaces of the block 10. In addition, front and rear side edges of the innermost end of the upper ridge 14 are also formed into chamfers 24 and 24. The other structures are the same as those in the first embodiment.

Thus, in the present embodiment, the edges between the indent 22 and the front and rear surfaces of each block 10 are chamfered in an arcuate cross-section to form chamfers 23 and 23. Therefore, even when the upper beam 10a of the block 10 located above the fitting part 12 undergoes a bending stress, stress concentration on the edges can be reduced.

Embodiment 3

Figure 16:
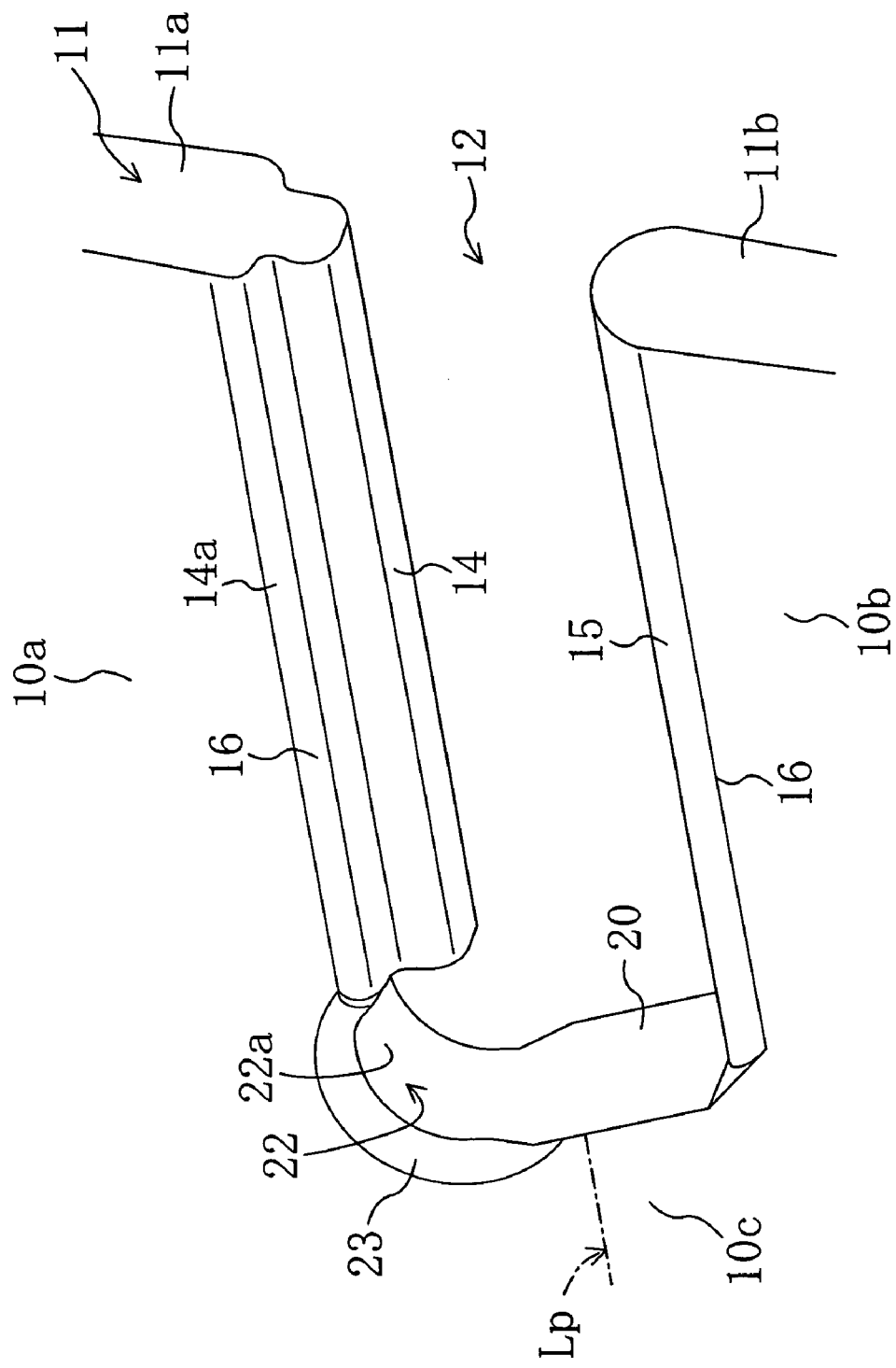
FIG. 16 is a view corresponding to FIG. 1, and showing a third embodiment of the present invention.
Figure 17:
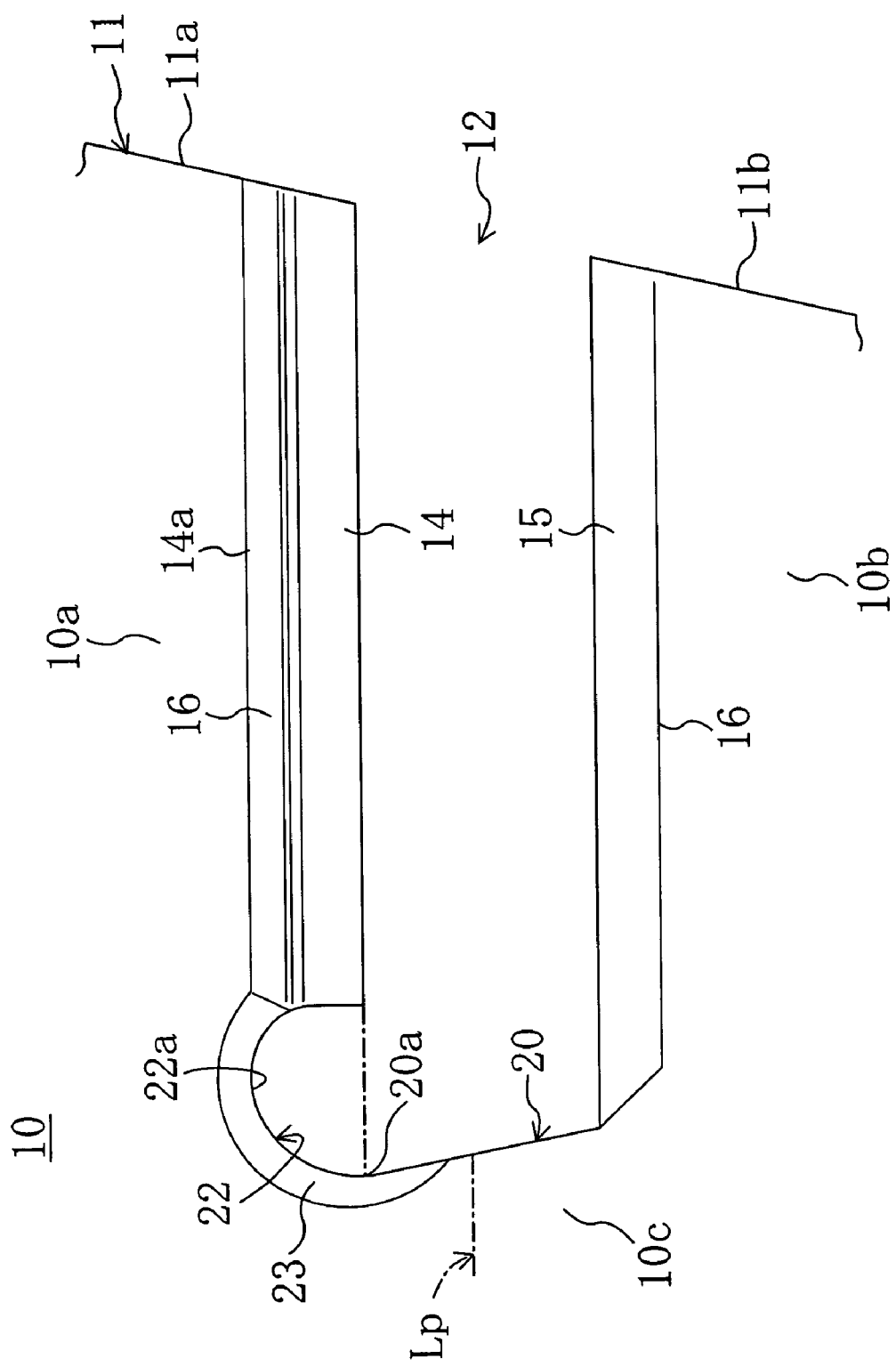
FIG. 17 is a view corresponding to FIG. 2, and showing the third embodiment.

FIGS. 16 and 17 shows a third embodiment of the present invention. In the present embodiment, the shape of the arcuate surface of the indent 22 of each block 10 is shorter at its end near to the upper ridge 14 than in the first and second embodiments, and the length thereof in the belt widthwise direction is correspondingly increased. The other structures are the same as those of the second embodiment.

When the indent 22 is provided in the manner of each of the first and second embodiments, the length of the upper ridge 14 in the belt widthwise direction is short, which may have an adverse effect on the securement of each block 10 to the tension member 1. In this embodiment, the length of the indent 22 is shortened at the upper ridge 14 side end which gives less effect on stress concentration. Therefore, while the effect of the indent 22 is ensured sufficiently, the length of the upper ridge 14 in the belt widthwise direction can be ensured to a large extent to secure each block 10 to the tension member 1 appropriately.

Embodiment 4

Figure 18:
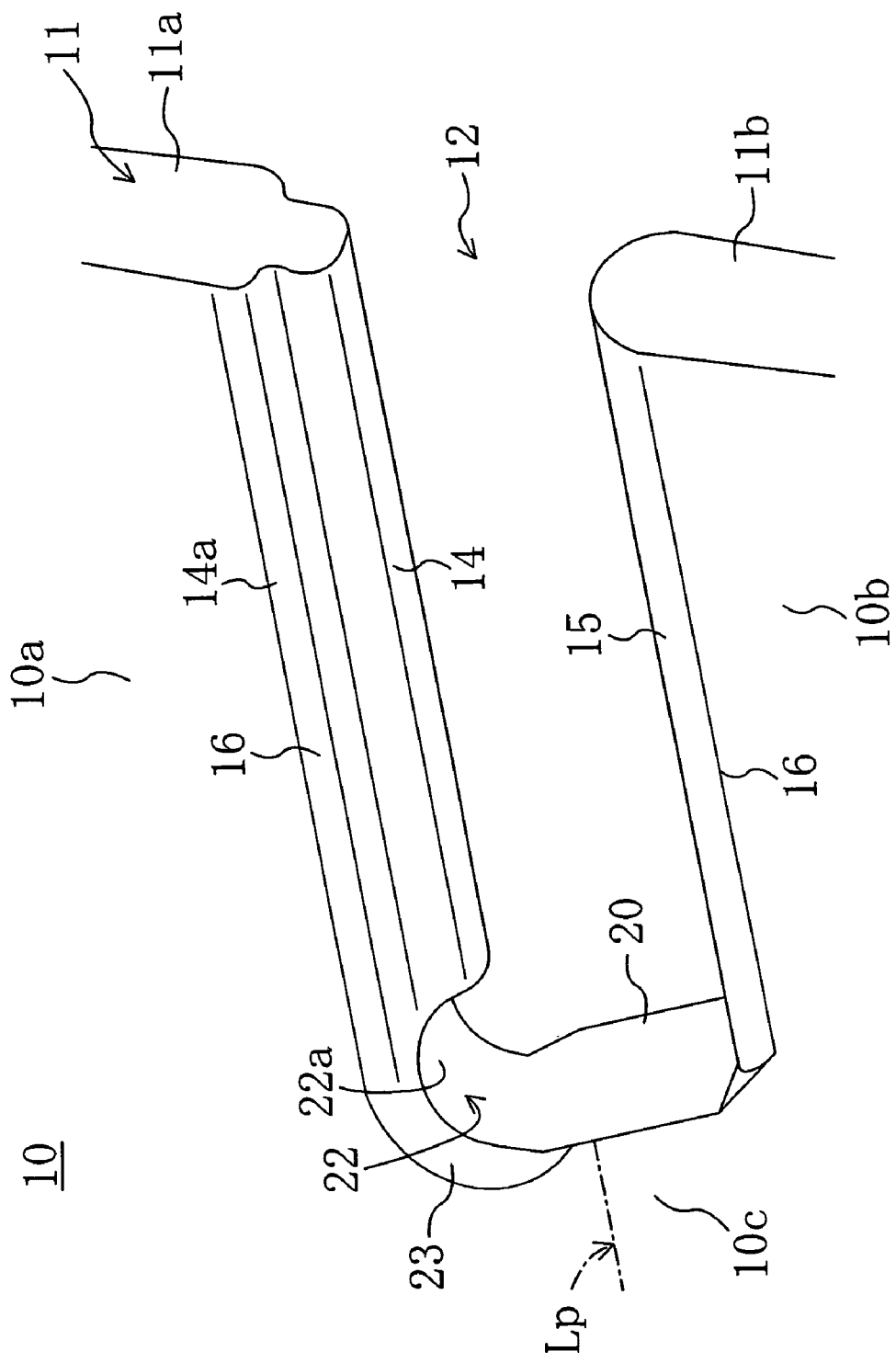
FIG. 18 is a view corresponding to FIG. 1, and showing a fourth embodiment of the present invention.
Figure 19:
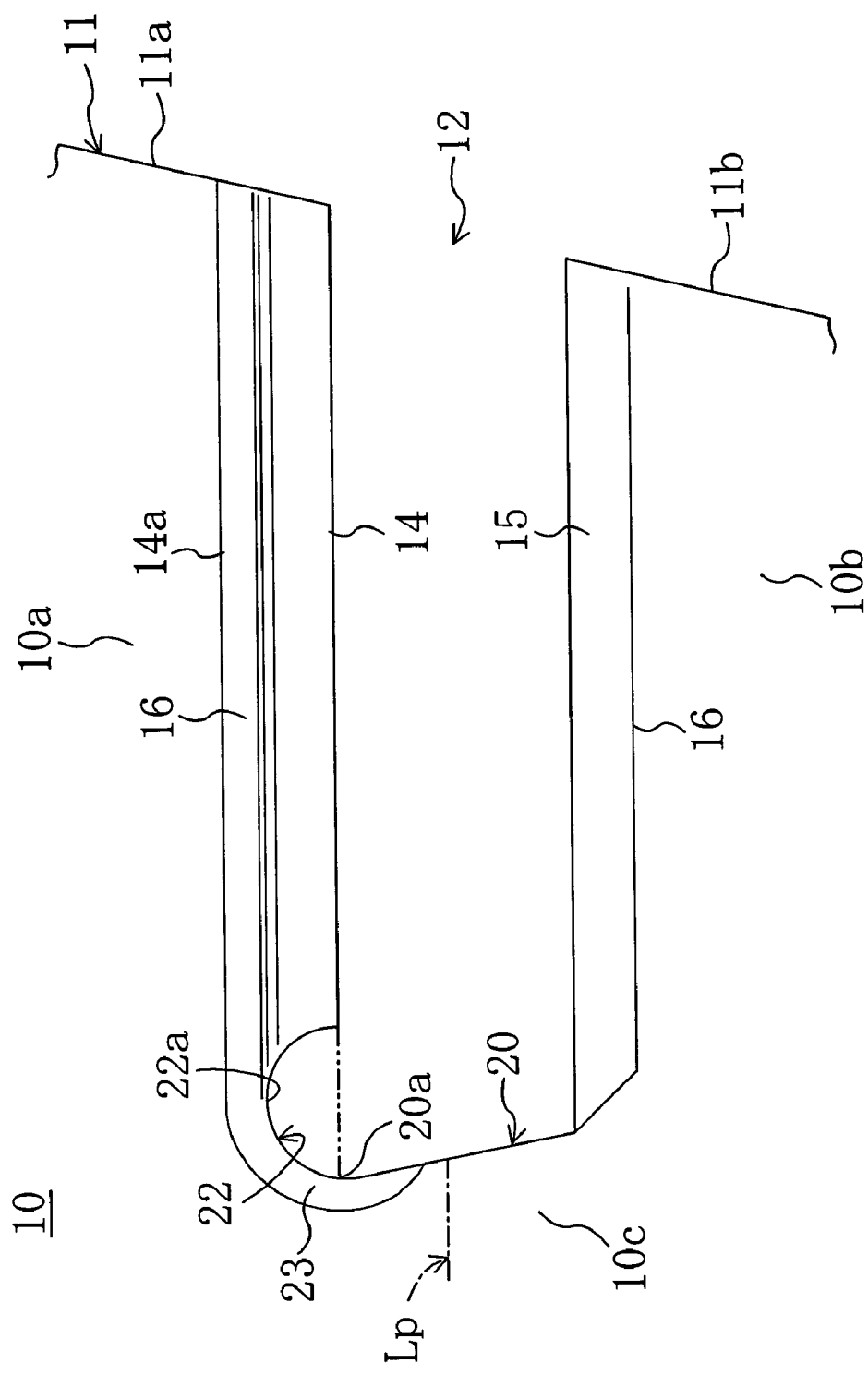
FIG. 19 is a view corresponding to FIG. 2, and showing the fourth embodiment.

FIGS. 18 and 19 show a fourth embodiment of the present invention. In the first to third embodiments, the uppermost end 22a of the indent 22 is located above the upper end 14a of the upper ridge 14. In this embodiment, the level of the uppermost end 22a of the indent 22 is identical with the upper end 14a of the upper ridge 14. The other structures are the same as those of the second embodiment.

Thus, the chamfers 23 and 23 at the edges between the indent 22 of each fitting part 12 of each block 10 and both the front and rear surfaces of the block 10 are identical in level with the rounded portions 16 and 16 at the edges between the upper ridge 14 of the fitting part 12 and both the front and rear surfaces of the block 10. This makes the occurrence of stress concentration more difficult.

Embodiment 5

Figure 20:
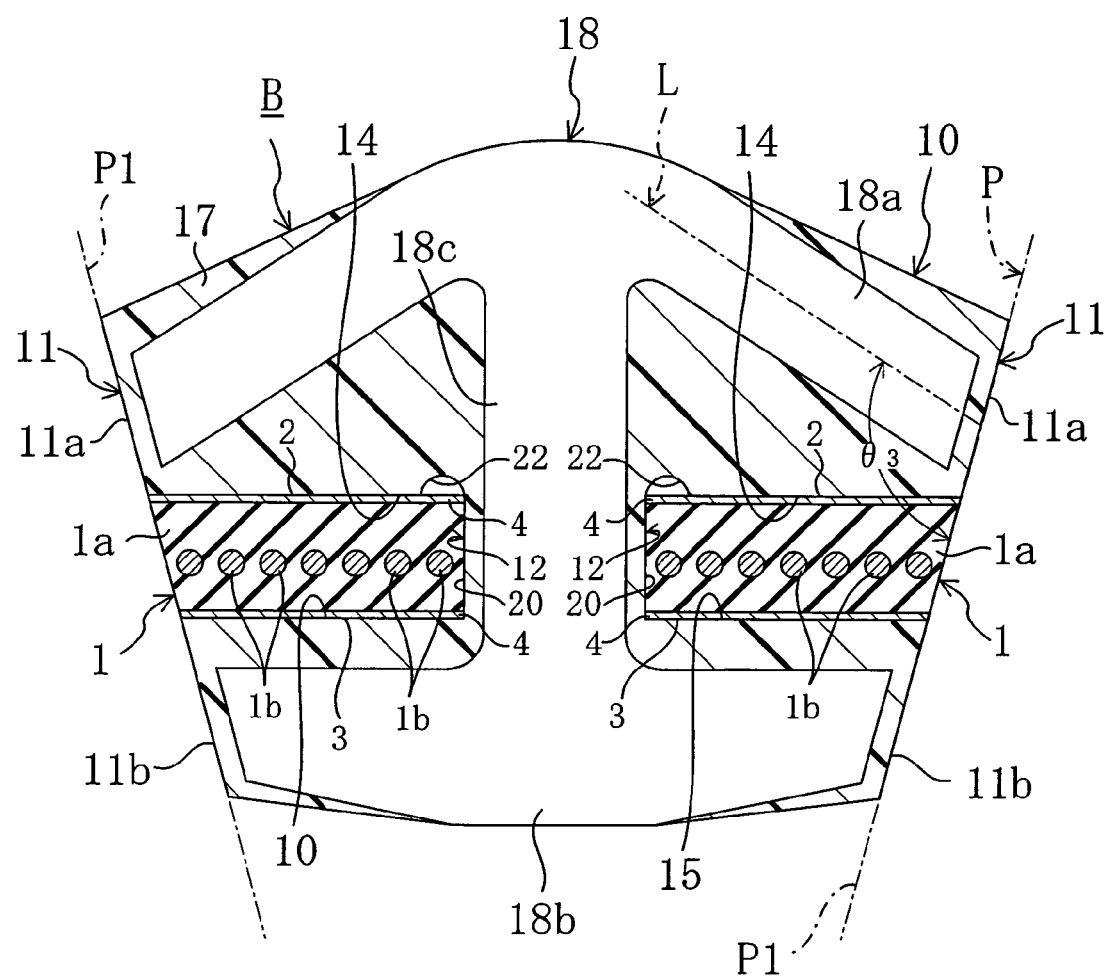
FIG. 20 is a cross-sectional view of a heavy duty power transmission V-belt according to a fifth embodiment of the present invention.

FIG. 20 shows a fifth embodiment of the present invention, in which the reinforcement 18 of each block 10 is different in shape from those of the first to forth embodiments. Specifically, in this embodiment, each branch of the upper beam 18a of the reinforcement 18 has substantially a linear plate shape, and is inclined downward in proceeding from its root end (the connecting part with the upper end of the center pillar 18c) to its distal end. When viewed as a whole, the upper beam 18a is angled substantially in an inverted V-shape that gradually rises from both ends toward the middle portion. Furthermore, a beam angle θ3 made by the longitudinal center line L of each branch of the upper beam 18a and the pulley groove side face P1 located closer to the center of the pulley P than the contact position of the upper contact part 11a of the contact part 11 of the block 10 side surface is set at 90° or more (θ3≧90°). In this embodiment, the innermost abutment surface 20 of the fitting part 12 of each block 10 is not inclined but formed substantially in parallel with a vertical plane along the length of the belt.

The other structures are the same as those of the first embodiment: the back of the fitting part 12 of each block 10 in the direction of insertion of the tension member 1 is provided at the upper corner with an indent 22 of substantially arcuate shape, and the indent 22 and the upper end 20a of the innermost abutment surface 20 are connected together by a curved surface to merge smoothly into each other.

Thus, in this embodiment, each branch of the upper beam 18a of the reinforcement 18 embedded in each block 10 of the belt B is inclined downwardly in proceeding from its root end (the connecting part with the upper end of the center pillar 18c) to the distal end. Furthermore, the beam angle θ3 made by the longitudinal center line L of each branch of the upper beam 18a and the pulley groove side face P1 located closer to the center of the pulley P than the contact position of the upper contact part 11a of the block 10 is set at 90° or more. Therefore, under the power transmission conditions that the belt B is wound around the pulley P, each block 10 receives a pressing force from each tension member 1 and is thereby pressed against the pulley groove side face P1. With a beam angle θ3 of 90°, when the upper contact part 11a of the block 10 receives a reaction force normal to the pulley groove side face P1 from the pulley groove side face P1, an upward bending moment that tends to cause the reaction force of the pulley groove side face P1 to push and bend the distal end of each branch of the upper beam 18a upwardly is not produced on the upper beam 18a. Therefore, only a tensile stress due to a shearing force in the belt lengthwise direction acting between each block 10 of the belt B and the tension member 1 under the conditions that power is transmitted between the belt B and the pulley P is applied to the root of the upper beam 18a as it is.

On the other hand, with a beam angle θ3 of more than 90°, a downward component of a reaction force of the pulley groove side face P1 produces a downward bending moment that tends to press and bend the distal end of each branch of the upper beam 18a downwardly, and the downward bending moment produces a compressive stress in the root of the upper beam 18a. Therefore, applied to the root of the upper beam 18a are a tensile stress due to a shearing force in the belt lengthwise direction as well as a compressive force due to an downward bending moment in the opposite direction. As a result, both the stresses cancel each other so that the tensile stress due to the shearing force can be reduced.

As can be seen from the above, according to the present embodiment, a large tensile stress does not act on the root of the upper beam 18a, which prevents the tensile stress from causing a fatigue failure in the root of the upper beam 18a. As a result, the power transmission load of the belt B can be increased without the increase in weight of the block 10.

Furthermore, since the beam angle θ3 made by the longitudinal center line L of each branch of the upper beam 18a and the pulley groove side face P1 located closer to the center of the pulley P than the contact position of the upper contact part 11a of the block 10 is set at 90° or more, the reinforcement 18 is located at a large distance above from the root of the upper beam 10a of the block 10. Therefore, the indents 22 and 22 can be formed in portions of the resin part 17 located below the root of the upper beam 10a of the block 10, and the formation of the indents 22 and 22 can also be facilitated.

Embodiment 6

Figure 21:
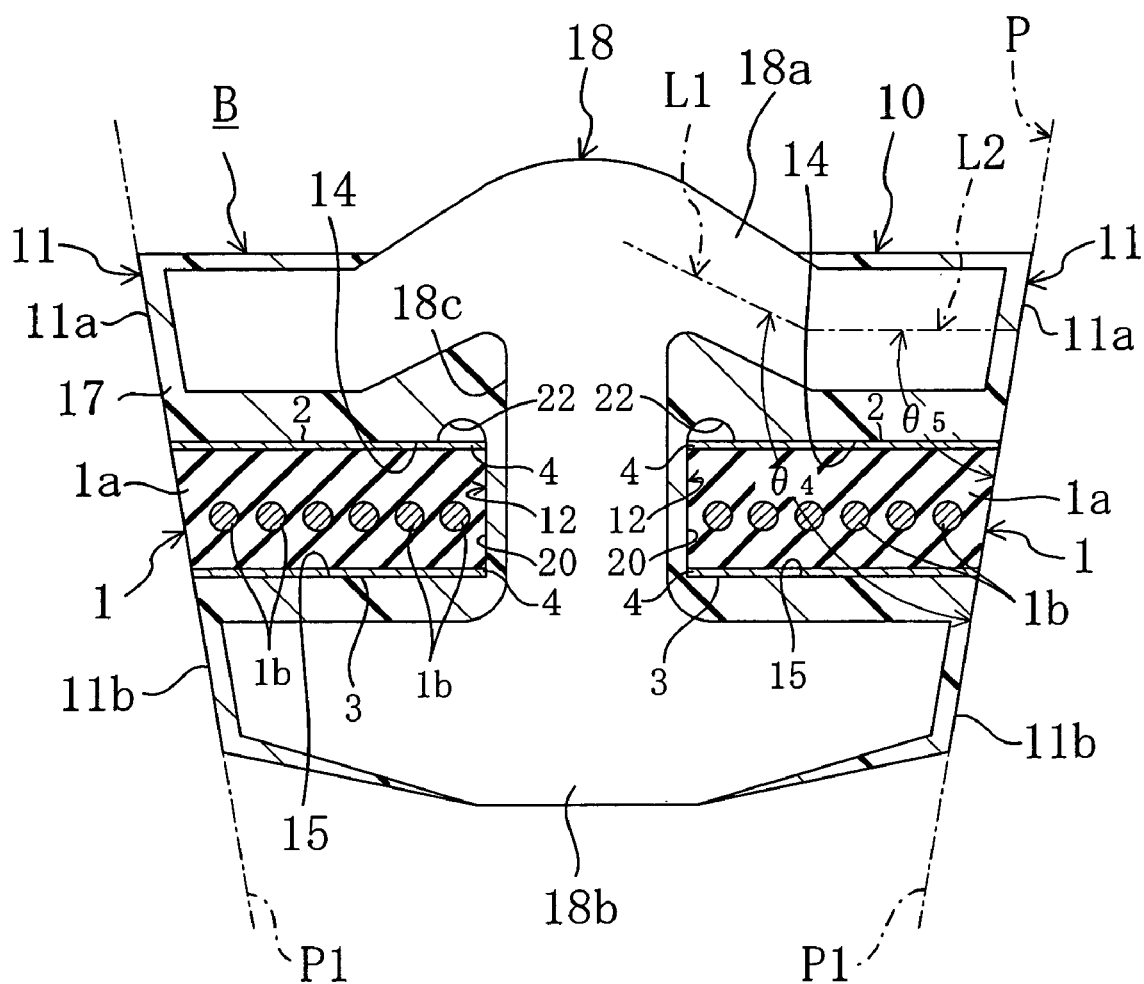
FIG. 21 is a view corresponding to FIG. 20, and showing a sixth embodiment of the present invention.

FIG. 21 shows a sixth embodiment of the present invention, in which the upper beams 18a of the reinforcement 18 of the block 10 is different in shape from that of the fifth embodiment.

Specifically, in this embodiment, each branch of the upper beam 18a of the reinforcement 18 embedded in each block 10 is bent: a portion of each branch from the root end to the middle is inclined downward with the approach to the middle, a portion of each branch from the middle to the distal end extends substantially horizontally, and therefore the entire upper beam 18a has an angled shape in which only the vicinity of the center of the upper beam 18a is raised from both side end portions.

Furthermore, a beam angle θ4 made by the longitudinal center line L1 of the root end side portion (i.e., a portion from the root end to the middle) of each branch of the upper beam 18a and the pulley groove side face P1 located closer to the center of the pulley P than the contact position of the upper contact part 11a of the block 10 side surface is set at 90° or more (θ4≧90°), like the fifth embodiment. On the other hand, a beam angle θ5 made by the longitudinal center line L2 of the distal end side portion (i.e., a portion from the middle to the distal end) of each branch of the upper beam 18a and the pulley groove side face P1 located closer to the center of the pulley P than the contact position of the upper contact part 11a of the block 10 side surface is set at less than 90° (θ5<90°). The other structures are the same as those of the fifth embodiment.

In this case, since the beam angle θ5 made by the longitudinal center line L2 of the distal end side portion of each branch of the upper beam 18a of the reinforcement 18 and the pulley groove side face P1 located closer to the center of the pulley P than the contact position of the upper contact part 11a of the block 10 is less than 90°, the height of each block 10 can be reduced. More specifically, when the entire upper beam 18a has a beam angle θ3 of 90° or more as in the fifth embodiment, the height of each block 10 should be high to ensure rooms for the fitting parts 12 and 12 in both side surfaces of the block 10. On the other hand, in this embodiment, since the beam angle θ4 made by the longitudinal center line L1 of only the root end side portion of each branch of the upper beam 18a and the pulley groove side face P1 located closer to the center of the pulley P than the contact position of the upper contact part 11a of the block 10 is 90° or more, the range of the beam angle θ4 is limited to part of the upper beams 18a and the height of each block 10 can be correspondingly reduced. Therefore, the block 10 can be reduced in size and weight to reduce the vibration of each block 10 of the moving belt B and the centrifugal tension of the belt B and thereby prevent early fracture of the tension member 1 due to heat production or wear, resulting in elongated lifetime of the belt B. As a result, both elongation in lifetime and increase in power transmission load of the belt B can be attained in a balanced manner.

Furthermore, according to this embodiment, a portion of the resin part 17 located under the inflection point as the bent point (boundary between the root end side portion and the distal end side portion) of each branch of the upper beam 18a is formed into a portion receiving a tensile stress.

Therefore, the stress on the root of each branch of the upper beam 18a is distributed thereby effectively preventing fatigue failure of the root.

Embodiment 7

Figure 22:
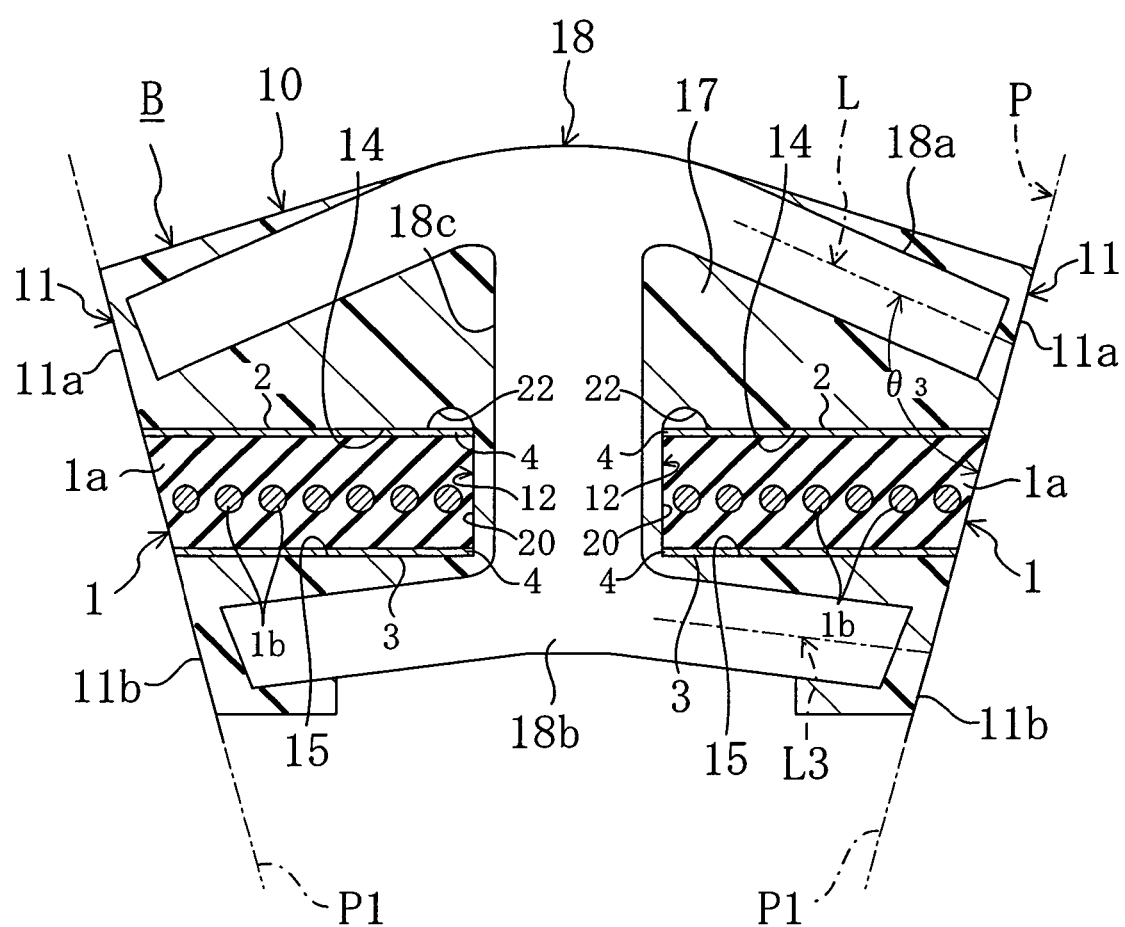
FIG. 22 is a view corresponding to FIG. 20, and showing a seventh embodiment of the present invention.

FIG. 22 shows a seventh embodiment of the present invention, in which the upper beam 18a of the reinforcement 18 of each block 10 is inclined like the fifth embodiment so that the beam angle θ3 made by each branch of the upper beam 18a and the pulley groove side face P1 is set at 90° or more, and in addition the lower beam 18b of the reinforcement 18 is also inclined so that the distal end of the longitudinal center line L3 of each branch thereof is located below the root end thereof.

According to this embodiment, as in the fifth embodiment, it can be prevented that a large tensile stress acts on the root of each branch of the upper beam 18a of the reinforcement 18, thereby preventing fatigue failure of the root of each branch of the upper beam 18a. In addition, for the same reason, a tensile stress on the root of each branch of the lower beam 18b can be reduced, thereby preventing fatigue failure of each branch of the lower beam 18b. Therefore, the power transmission load of the belt B can be further increased.

Embodiment 8

Figure 23:
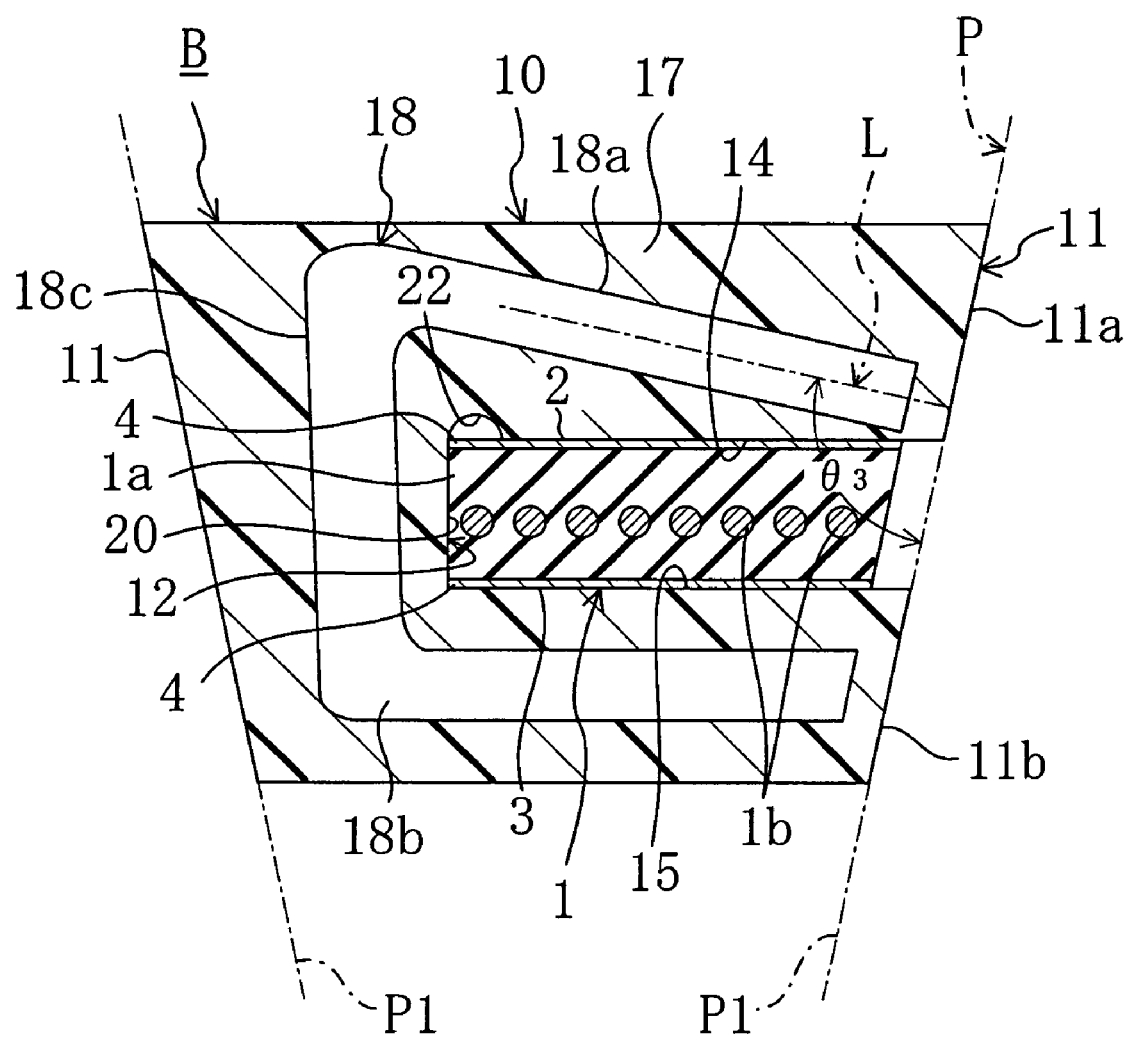
FIG. 23 is a view corresponding to FIG. 20, and showing an eighth embodiment of the present invention.

FIG. 23 shows an eighth embodiment of the present invention. In the fifth to seventh embodiments, the reinforcement 18 of substantially H-shape is embedded in each block 10. In this embodiment, the reinforcement 18 has substantially a U-shape formed by upper and lower beams 18a and 18b and a pillar 18c connecting the root ends of both the beams 18a and 18b. Furthermore, only one of the side surfaces of each block 10 is formed with a fitting part 12, and a single tension member 1 is fitted into the fitting part 12 so as to be located substantially in the middle of the belt width (substantially in the middle of each block 10 in the lateral direction). The other side surface of each block 10 has no fitting part 12, and the whole thereof forms a contact part 11 with the pulley groove side face P1.

Furthermore, the beam angle θ3 of the upper beam 18a of the reinforcement 18 (the angle made by the longitudinal center line L of the upper beam 18a and the pulley groove side face P1 located closer to the center of the pulley P than the contact position of the upper contact part 11a of the block 10) is set at 90° or more. The other structures are the same as those of the fifth embodiment. Therefore, the eighth embodiment can also exhibit the same effects as those of the fifth embodiment.

Other Embodiments

The beam angles θ3 and θ4 in the fifth to eighth embodiments have to be 90° or more, but its upper limit is preferably 110° to 115°.

In the fifth to eighth embodiments, the upper beam 18a of the reinforcement 18 or its branch has a linear shape or an angled shape formed in a combination of linear shapes, but may have a curved shape. In such a case, the beam angle can be defined as an angle made by the tangent to each point on the longitudinal center line of the upper beam 18a or its branch and the pulley groove side face P1, and each beam angle thus obtained may be 90° or more.

In each of the foregoing embodiments, the top and bottom surfaces of each tension member 1 are formed with upper recesses 2, 2, . . . and lower recesses and 3, 3, . . . , and each block 10 is formed correspondingly with the upper and lower ridges 14 and 15. The pairing of recess and ridge can be changed appropriately for each block 10. For example, the top and bottom surfaces of the tension member 1 may be formed with ridges as inserting parts, while each block may be formed with recesses as receiving parts.

In each of the foregoing embodiments, the back of the fitting part 12 of each block 10 in the direction of insertion of the tension member 1 is provided at the upper corner with an indent 22. Alternatively, the back of the fitting part 12 of each block 10 in the direction of insertion of the tension member 1 may be provided at the lower corner with an indent formed by downwardly recessing a portion of the resin part 17 located between the lower ridge 15 and the innermost abutment surface 20. Alternatively, the back of the fitting part 12 of each block 10 in the direction of insertion of the tension member 1 may be provided at both the upper and lower corners with indents, respectively. These variations can also exhibit the same effects as those exhibited by the embodiments having an indent 22 only at the upper corner.

Next, a specific example of this invention and a comparative example will be described. Fabricated as a heavy duty power transmission V-belt was a block belt having a belt angle of 26° (i.e., a belt side face angle θ2 of 13°), a block width of 25 mm on the belt line, a block pitch of 3 mm in the belt lengthwise direction, a block thickness of 2.95 mm, and a belt length of 612 mm. Each block was formed by insert molding a reinforcement of a 2 mm-thick, lightweight, high-strength aluminum alloy into phenol resin.

Figure 27:
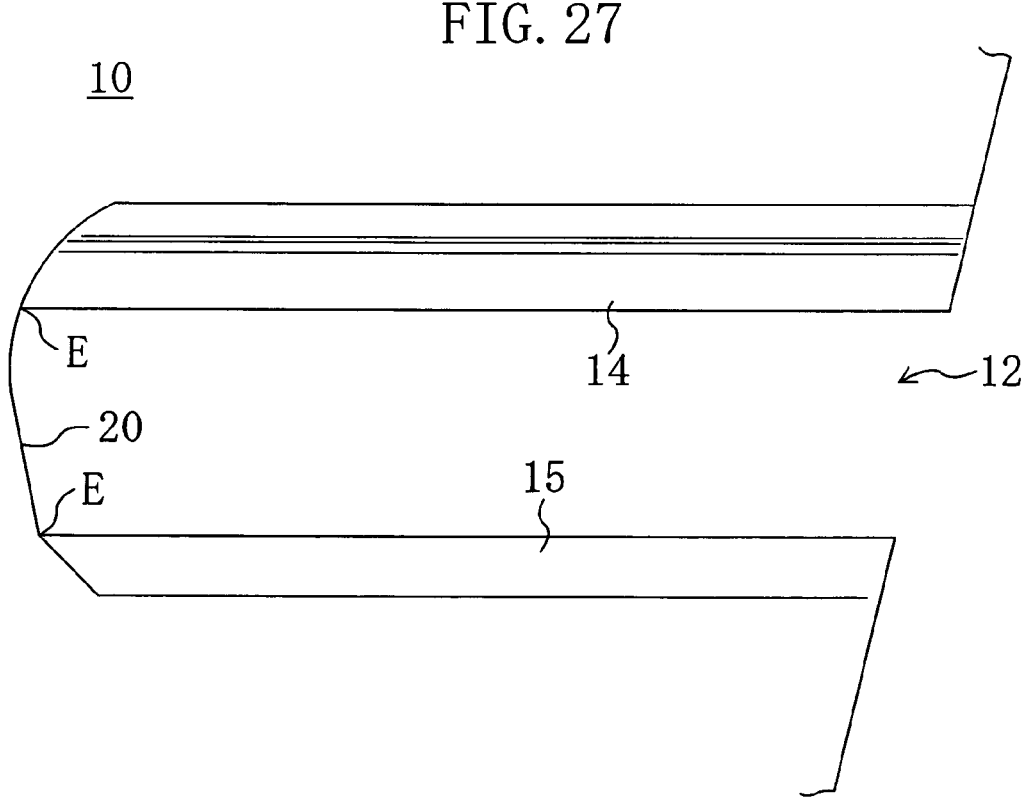
FIG. 27 is a view corresponding to FIG. 2, and showing the related art.

Based on the block belt having the above structure, a belt having the configuration of the first embodiment (see FIGS. 1 to 10) was fabricated as an inventive example, and the back of the fitting part of each block in the direction of insertion of the tension member was formed at the upper corner with an indent having an inner diameter of 2.5 mm and substantially an arcuate shape along the innermost abutment surface. On the other hand, a comparative example was a belt different from the inventive example only in that it had no indent (see FIGS. 6 and 27). The other structures were the same as those of the inventive example. In both the inventive and comparative examples, the initial interference between the tension member and the block was 0.06 mm and the projection allowance was 0.06 mm.

Each of the belts of the examples was subjected to a running durability test, and measurements were made of the temperature and noise of the belt at an early stage of the running and at the time that a predetermined time had passed. The conditions for the belt running durability test were as follows.

Figure 24:
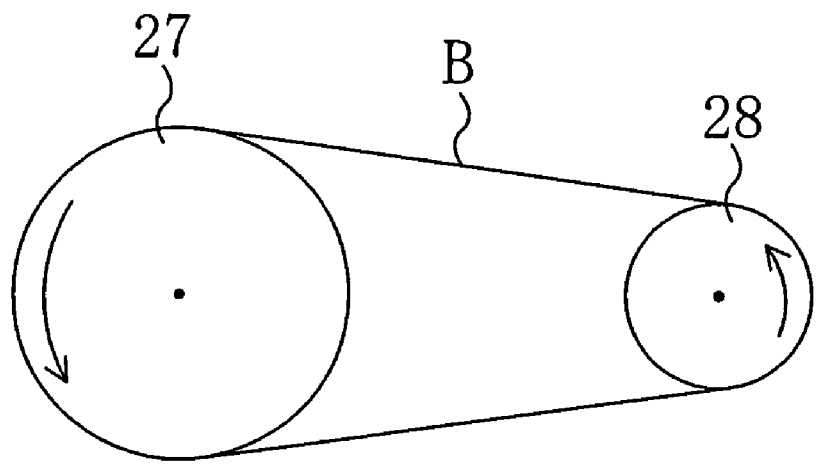
FIG. 24 is a schematic view of a belt durability testing machine.

As shown in FIG. 24, each belt B was entrained between a drive pulley 27 of 120 mm diameter and a driven pulley 28 of 60 mm diameter, and its durability was evaluated when the drive pulley 27 was rotated with a drive torque of 73 N·m at 6000 rpm under the condition of an atmospheric temperature of 90° C. The belt temperature was obtained by measuring the temperature of the belt side face (side surface of the tension member) using a non-contact thermometer.

The noise test for each belt was conducted by detaching the belt from the running test machine at each evaluation time, setting the belt to the noise test machine and measuring the noise level of the belt using a noise meter.

Figure 25:
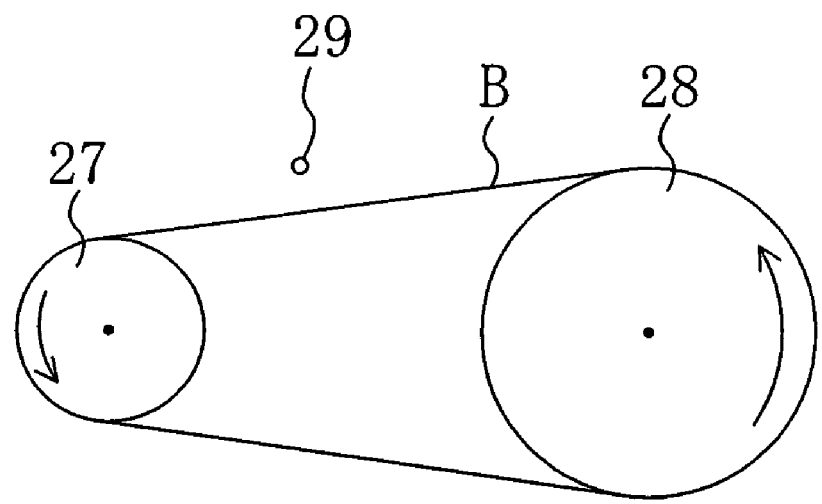
FIG. 25 is a schematic view of a belt noise testing machine.
Figure 26:
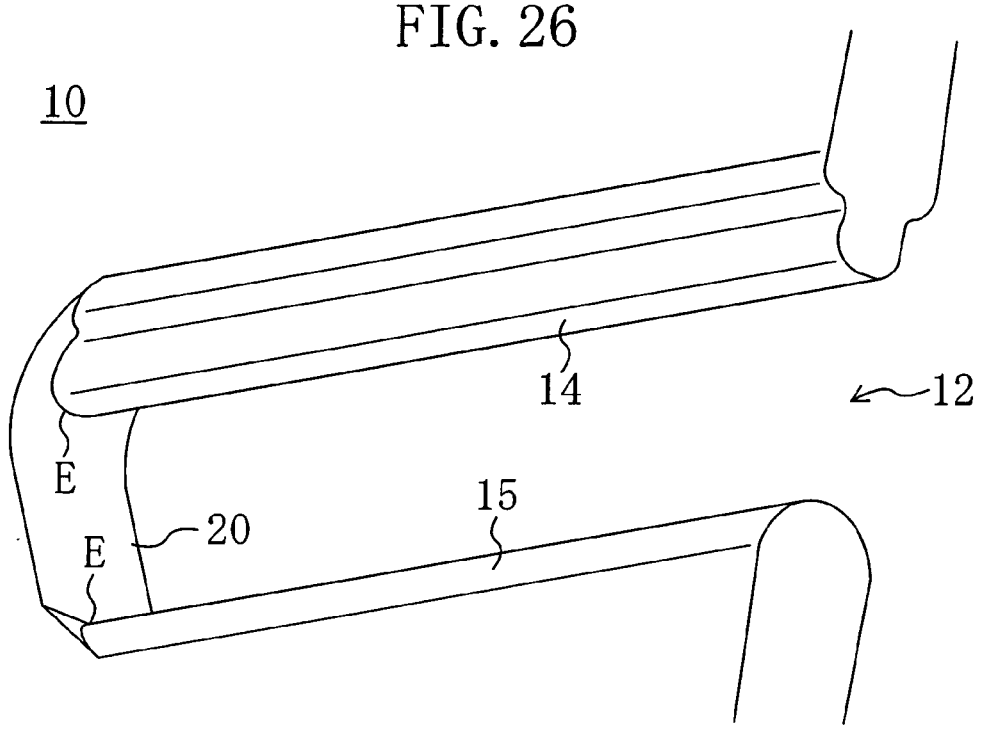
FIG. 26 is a view corresponding to FIG. 1, and showing a related art.

Specifically, as shown in FIG. 25, each belt B was entrained between a drive pulley 27 of 60 mm diameter and a driven pulley 28 of 120 mm diameter and run by rotating the drive pulley 27 at 2500 rpm with no load thrown on the driven pulley 28 under the room temperature condition, and the noise level was measured with a microphone 29 placed in a plane passing through the rotation axes of the drive and driven pulleys 27 and 28 and at a point 50 mm away from the axis of the drive pulley 27 toward the axis of the driven pulley 28 and 100 mm away from the drive pulley 27. The results of the above measurements are shown in Table 1.

TABLE 1

|  |  | Inventive Ex. | Comparative Ex. |
|---|---|---|---|
| Noise level (dBA) | Initial stage | 77 | 76 |
|  | 150 hrs | 82 | 85 |
|  | 250 hrs | 86 | 95 |
| Belt temperature (° C.) | Initial stage | 115 | 120 |
|  | 50 hrs | 93 | 101 |
|  | 150 hrs | 90 | 97 |
|  | 250 hrs | 88 | 94 |
|  | 350 hrs | 88 | 92 |
|  | 500 hrs | 86 | 91 |
| Durability | Time (hrs) | 687 | 511 |
|  | Breakage mode | Fracture at upper beam root | Fracture at upper beam root |

Now, consideration will be made of the results of Table 1. In respect of the belt noise at the initial stage of running, the noise level of the inventive example was about 1 dB higher than that of the comparative example, but it can be said that there is no substantial difference between both the examples. However, when the running time had passed for 250 hours, the noise level of the inventive example was about 9 dB lower than that of the comparative example. Therefore, it can be found that the inventive example can suppress noises sufficiently for a long time.

In respect of the belt temperature, the temperature of the inventive example was lower than that of the comparative example at any point in time from the initial stage of running until the passage of 500 hours. Therefore, it can be seen that the effects of the inventive example is effective.

Furthermore, in respect of the belt durability, the inventive example could run for a longer time than the comparative example. Therefore, the effects of the inventive example have proven to be high.

What is claimed is:

1. A power transmission V-belt comprising:
at least one endless tension member a top surface of which on the back face side of the belt is provided with a plurality of upper receiving/inserting parts aligned lengthwise of the belt and a bottom surface of which on the bottom face side of the belt is provided with a plurality of lower receiving/inserting parts aligned lengthwise of the belt in correspondence with the plurality of upper receiving/inserting parts; and
a plurality of blocks each of which has at least one fitting part into which one said tension member is fitted by press insertion and contact parts respectively provided in side surfaces thereof in the widthwise direction of the belt with contactable with side faces of a pulley groove, said at least one fitting part being formed at the upper face with an upper inserting/receiving part mating with the upper receiving inserting part of the tension member and being formed at the lower face with a lower inserting/receiving part mating with the lower receiving/inserting part of the tension member,
wherein through the fitting of the tension member into the fitting part of each of the blocks, the plurality of blocks are securely engaged to the tension member so tat both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission,
wherein each of the blocks is formed of a resin part constituting at least the contact part an the fitting part, an a reinforcement at least partly embedded in the resin part and made of a material having a higher modulus of elasticity than he resin part,
wherein the back of the fitting part of each of the blocks in the direction of insertion of the tension member is formed with an abutment surface against which an abutment part of the tension member located at a leading end thereof in the direction of insertion of the tension member abuts,
wherein the fitting part includes an indent formed by a recessed portion of the resin part located between the upper inserting/receiving part and the innermost abutment surface to prevent cracking of said blocks in a portion where said upper inserting/receiving part and said innermost abutment surface meet, and
wherein the indent forms a step in a part of the tension member with the use of the belt and is engaged to the step.

2. The power transmission V-belt of claim 1, wherein the indent and the upper end of the innermost abutment surface are connected together by a curved surface to merge smoothly into each other.

3. The power transmission V-belt of claim 1, wherein the indent has substantially an arcuate shape.

4. The power transmission V-belt of claim 1, wherein edges between the indent and both the front and rear surfaces of each of the blocks in the lengthwise direction of the belt are chamfered in an arcuate cross-section.

5. The power transmission V-belt of claim 1, wherein the uppermost end of the indent is located above the upper end of the upper inserting/receiving pan of the fitting part.

6. The power transmission V-belt of claim 1, wherein an edge between the upper receiving/inserting part and the abutment part of the tension member is located in the indent.

7. The power transmission V-belt of claim 1,
wherein the reinforcement of each of the blocks is formed of upper and lower beams located above and below the fitting part, respectively, and a pillar connecting between the root ends of both the upper and lower beams, and
wherein a beam angle made by the longitudinal center line of the upper beam and the side face of the pulley groove located closer to the center of the pulley than the contact position of the contact part of each said block located above the fitting part is set at 90° or more.

8. The power transmission V-belt of claim 1,
wherein the reinforcement of each of the blocks is formed of upper and lower beams located above and below the fitting part, respectively, and a pillar connecting between the root ends of both the upper and lower beams, and
wherein a beam angle made by the longitudinal center line of a root end side portion of the upper beam and the side face of the pulley groove located closer to the center of the pulley than the contact position of the contact part of each said block located above the fitting part is set at 90° or more, while a beam angle made by the longitudinal center line of a distal end side portion of the upper beam and the side face of the pulley groove located closer to the center of the pulley than the contact position of the contact part of each said block located above the fitting part is set at less than 90°.

9. A power transmission V-belt comprising:
at least one endless tension member a top surface of which on the back face side of the belt is provided with a plurality of upper receiving/inserting parts aligned lengthwise of the belt and a bottom surface of which on the bottom face side of the belt is provided with a plurality of lower receiving/inserting parts aligned lengthwise of the belt in correspondence with the plurality of upper receiving/inserting parts; and
a plurality of blocks each of which has at least one fitting part into which one said tension member is fitted by press insertion and contact parts respectively provided in side surfaces thereof in the widthwise direction of the belt with contactable with side faces of a pulley groove, said at least one fitting part being formed at the upper face with an upper inserting/receiving part mating with the upper receiving inserting part of the tension member and being formed at the lower face with a lower inserting/receiving part mating with the lower receiving/inserting part of the tension member,
wherein through the fitting of the tension member into the fitting part of each of the blocks, the plurality of blocks are securely engaged to the tension member so that both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission,
wherein each of the blocks is formed of a resin part constituting at least the contact part an the fitting part, an a reinforcement at least partly embedded in the resin part and made of a material having a higher modulus of elasticity than the resin part,
wherein the back of the fitting part of each of the blocks in the direction of insertion of the tension member is formed with an innermost abutment surface against which an abutment part of the tension member located at a leading end thereof in the direction of insertion of the tension member abuts,
wherein the fitting part includes an indent formed by a recessed portion of the resin part located between the upper inserting/receiving part and the innermost abutment surface to prevent cracking of said blocks in a portion where said upper inserting/receiving part and said innermost abutment surface meet,
wherein the indent forms a step in a part of the tension member with the use of the belt and is engaged to the step, and
wherein the relationship $\theta2-3<\theta1<\theta2+3$ is established between an innermost abutment surface angle $\theta1$ (unit: °) made by a portion of the innermost abutment surface located between corresponding positions thereof to the lower end of the upper inserting/receiving part of the fitting part and the upper end of the lower inserting/receiving part of the fitting part and a vertical plane along the length of the belt and a belt side face angle $\theta2$ (unit: °) made by the contact parts of the right and left side surfaces of each of the blocks and the vertical plane.

10. A power transmission V-belt comprising:
at least one endless tension member a top surface of which on the back face side of the belt is provided with a plurality of upper receiving/inserting parts aligned lengthwise of the belt and a bottom surface of which on the bottom face side of the belt is provided with a plurality of lower receiving/inserting parts aligned lengthwise of the belt in correspondence with the plurality of upper receiving/inserting parts; and
a plurality of blocks each of which has at least one fitting part into which one said tension member is fitted by press insertion and contact parts respectively provided in side surfaces thereof in the widthwise direction of the belt with contactable with side faces of a pulley groove, said at least one fitting part being formed at the upper face with an upper inserting/receiving part mating wit the upper receiving inserting pert of the tension member and being formed at the lower face with a lower inserting/receiving part mating with the lower receiving/inserting part of the tension member,
wherein through the fitting of the tension member into the fitting part of each of the blocks, the plurality of blocks are securely engaged to the tension member so tat both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission,
wherein each of the blocks is formed of a resin part constituting at least the contact part an the fitting part, an a reinforcement at least partly embedded in the resin part and made of a material having a higher modulus of elasticity than the resin part,
wherein the back of the fitting part of each of the blocks in the direction of insertion of the tension member is formed with an abutment surface against which an abutment part of the tension member located at a leading end thereof in the direction of insertion of the tension member abuts,
wherein the fitting part includes an indent Conned by a recessed portion of the resin part located between the lower inserting/receiving part and the innermost abutment surface to prevent cracking of said blocks in a portion where said lower inserting/receiving part and the innermost abutment surface meet, and
wherein the indent forms a step in a part of the tension member with the use of the belt and is engaged to the step.

11. The power transmission V-belt of claim 10, wherein the indent and the lower end of the innermost abutment surface are connected together by a curved surface to merge smoothly into each other.

12. The power transmission V-belt of claim 10, wherein the indent has substantially an arcuate shape.

13. The power transmission V-belt of claim 10, wherein edges between the indent and both the front and rear surfaces of each of the blocks in the lengthwise direction of the bell are chamfered in an arcuate cross-section.

14. The power transmission V-belt of claim 10, wherein the lowermost end of the indent is located at the same level with or below the lower end of the lower inserting/receiving part of the fitting part.

15. The power transmission V-belt of claim 10, wherein the edge between the lower receiving/inserting part and the abutment part of the tension member is located in the indent.

16. A power transmission V-belt comprising:
at least one endless tension member atop surface of which on the back face side of the belt is provided with a plurality of upper receiving/inserting parts aligned lengthwise of the belt and a bottom surface of which on the bottom face side of the belt is provided with a plurality of Iowa receiving/inserting parts aligned lengthwise of the belt in correspondence with the plurality of upper receiving/inserting parts; and a plurality of blocks each of which has at least one fitting part into which one said tension member is fitted by press insertion and contact parts respectively provided in side surfaces thereof in the widthwise direction of the belt with contactable with side faces of a pulley groove, said at least one fitting part being formed at the upper face with an upper inserting/receiving part mating with the upper receiving inserting part of the tension member and being formed at the lower face with a lower inserting/receiving part mating with the lower receiving/inserting part of the tension member, wherein through the fitting of the tension member into the fitting part of each of the blocks, the plurality of blocks are securely engaged to the tension member so that both the contact part of the side surface of each of the blocks in the widthwise direction of the belt and the side surface of the tension member are brought into contact with the side face of the pulley groove, whereby mating engagement between the inserting/receiving parts of the blocks and the receiving/inserting parts of the tension member allow power transmission, wherein each of the blocks is formed of a resin part constituting at least the contact part an the fitting part, an a reinforcement at least partly embedded in the resin part and made of a material having a higher modulus of elasticity than the resin part, wherein the back of the fitting part of each of the blocks in the direction of insertion of the tension member is formed wit an innermost abutment surface against which an abutment part of the tension member located at a leading end thereof in the direction of insertion of the tension member abuts, wherein the fitting part includes an indent formed by a recessed portion of the resin part located between the upper inserting/receiving part and the innermost abutment surface to prevent cracking of said blocks in a portion where said upper inserting/receiving part and said innermost abutment surface meet, wherein the indent forms a step in a part of the tension member with the use of the belt and is engaged to the step, and wherein the relationship $\theta 2-3<\theta 1<\theta 2+3$ is established between an innermost abutment surface angle $\theta 1$ made by a portion of the innermost abutment surface located between corresponding positions thereof to the lower end of the upper inserting/receiving part of the fitting part of the upper end of the lower inserting/receiving part of the fitting part and a vertical plane along the length of the belt and a belt side face angle $\theta 2$ made by the contact parts of the right and left side surfaces of each of the blocks and the vertical plane.

* * * * *

UNITED STATES PATENT AND TRADEMARK OFFICE
CERTIFICATE OF CORRECTION

PATENT NO. : 7,097,581 B2
APPLICATION NO. : 10/642286
DATED : August 29, 2006
INVENTOR(S) : Masahiro Inukai et al.

It is certified that error appears in the above-identified patent and that said Letters Patent is hereby corrected as shown below:

On Title page
Item (75) Inventors: Masahiro Inukai, "Kobe" should read Masahiro Inukai, --Hyogo--;
Keizo Nomaka, "Kobe" should read --Hyogo--;

What is claimed is:

Column 21, line 62, "tat" should read --that--;

Column 22, line 4, "an the fitting" should read --and the fitting--;

Column 22, line 5, "an a reinforcement" should read --and a reinforcement--;

Column 22, line 7, "he resin part" should read --the resin part--;

Column 22, line 35, "pan" should read --part--;

Column 23, line 32, "an the fitting" should read --and the fitting--;

Column 23, line 33, "an a reinforcement" should read --and a reinforcement--;

Column 24, line 11, "wit the upper" should read --with the upper--;

Column 24, line 11, "pert" should read --part--;

Column 24, line 17, "tat both" should read --that both--;

Column 24, line 26, "an the fitting" should read --and the fitting--;

Column 24, line 27, "an a reinforcement" should read --and a reinforcement--;

Column 24, line 36, "Conned" should read --formed--;

Column 24, line 53, "bell" should read --belt--;

Column 24, line 63, "atop" should read --a top--;

Column 25, line 1, "Iowa" should read --lower--;

Column 25, line 26, "an the fitting" should read --and the fitting--;

UNITED STATES PATENT AND TRADEMARK OFFICE
CERTIFICATE OF CORRECTION

| | |
|---|---|
| PATENT NO. | : 7,097,581 B2 |
| APPLICATION NO. | : 10/642286 |
| DATED | : August 29, 2006 |
| INVENTOR(S) | : Masahiro Inukai et al. |

It is certified that error appears in the above-identified patent and that said Letters Patent is hereby corrected as shown below:

Column 25, line 27, "an a reinforcement" should read --and a reinforcement--; and Column 26, line 3, "wit an innermost" should read --with an innermost--.

Signed and Sealed this

Twenty-third Day of January, 2007

JON W. DUDAS
*Director of the United States Patent and Trademark Office*